US009628808B2

United States Patent
Su et al.

(10) Patent No.: US 9,628,808 B2
(45) Date of Patent: Apr. 18, 2017

(54) ENCODING PERCEPTUALLY-QUANTIZED VIDEO CONTENT IN MULTI-LAYER VDR CODING

(71) Applicant: DOLBY LABORATORIES LICENSING CORPORATION, San Francisco, CA (US)

(72) Inventors: Guan-Ming Su, Fremont, CA (US); Qian Chen, San Jose, CA (US); Hubert Koepfer, Milpitas, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/771,101

(22) PCT Filed: Mar. 25, 2014

(86) PCT No.: PCT/US2014/031716
§ 371 (c)(1),
(2) Date: Aug. 27, 2015

(87) PCT Pub. No.: WO2014/160705
PCT Pub. Date: Oct. 2, 2014

(65) Prior Publication Data
US 2016/0014420 A1    Jan. 14, 2016

Related U.S. Application Data

(60) Provisional application No. 61/805,388, filed on Mar. 26, 2013, provisional application No. 61/861,555, filed on Aug. 2, 2013.

(51) Int. Cl.
*H04N 19/176* (2014.01)
*H04N 19/30* (2014.01)
(Continued)

(52) U.S. Cl.
CPC ......... *H04N 19/176* (2014.11); *H04N 19/136* (2014.11); *H04N 19/30* (2014.11);
(Continued)

(58) Field of Classification Search
None
See application file for complete search history.

(56) References Cited

U.S. PATENT DOCUMENTS 5,576,772 A  *  11/1996  Kondo ............... G06T 7/2026
                                              348/699
6,233,283 B1     5/2001  Chiu
(Continued)

FOREIGN PATENT DOCUMENTS

EP    1827024       8/2007
JP    2011-517245   5/2011
(Continued)

OTHER PUBLICATIONS

Bae, J. et al "Adaptive Tone-Mapping Operator for HDR Images Based on Image Statistics" IEEE Region 10 Conference, Nov. 21-24, 2011, pp. 1435-1438.

*Primary Examiner* — Jorge L Ortiz Criado
*Assistant Examiner* — Samuel D Fereja

(57) ABSTRACT

Input VDR images are received. A candidate set of function parameter values for a mapping function is selected from multiple candidate sets. A set of image blocks of non-zero standard deviations in VDR code words in at least one input VDR image is constructed. Mapped code values are generated by applying the mapping function with the candidate set of function parameter values to VDR code words in the set of image blocks in the at least one input VDR image. Based on the mapped code values, a subset of image blocks of standard deviations below a threshold value in mapped code words is determined as a subset of the set of image blocks. Based at least in part on the subset of image blocks, it is
(Continued)

determined whether the candidate set of function parameter values is optimal for the mapping function to map the at least one input VDR image.

21 Claims, 8 Drawing Sheets

(51) Int. Cl.
  *H04N 19/136* (2014.01)
  *H04N 19/44* (2014.01)
  *H04N 19/50* (2014.01)
  *H04N 19/70* (2014.01)
(52) U.S. Cl.
  CPC ............ *H04N 19/44* (2014.11); *H04N 19/50* (2014.11); *H04N 19/70* (2014.11)

(56) References Cited

U.S. PATENT DOCUMENTS

| | | | |
|---|---|---|---|
| 6,560,370 B2 * | 5/2003 | Ribas-Corbera | G06T 9/00 382/239 |
| 6,937,767 B1 * | 8/2005 | Burak | G06T 9/007 375/E7.04 |
| 8,811,490 B2 | 8/2014 | Su | |
| 2003/0212944 A1 * | 11/2003 | Kondo | H04N 19/89 714/779 |
| 2006/0215918 A1 * | 9/2006 | Kimura | H04N 19/44 382/233 |
| 2007/0091997 A1 * | 4/2007 | Fogg | H04N 19/56 375/240.1 |
| 2007/0269132 A1 * | 11/2007 | Duan | G06T 5/007 382/274 |
| 2007/0274383 A1 | 11/2007 | Yu | |
| 2008/0137990 A1 * | 6/2008 | Ward | H04N 19/30 382/299 |
| 2009/0046207 A1 * | 2/2009 | Salvucci | G06T 9/001 348/663 |
| 2009/0175338 A1 * | 7/2009 | Segall | G06T 7/2013 375/240.14 |
| 2010/0020866 A1 * | 1/2010 | Marpe | H04N 19/00569 375/240.02 |
| 2010/0172411 A1 * | 7/2010 | Efremov | H04N 19/136 375/240.12 |
| 2012/0170659 A1 | 7/2012 | Chaudhury | |
| 2012/0189216 A1 * | 7/2012 | Segall | G06T 5/002 382/232 |
| 2012/0321182 A1 * | 12/2012 | Yamamoto | H04N 19/176 382/166 |
| 2013/0034170 A1 * | 2/2013 | Chen | H04N 13/00 375/240.25 |
| 2013/0108183 A1 * | 5/2013 | Bruls | G06T 9/004 382/233 |
| 2013/0148029 A1 | 6/2013 | Gish | |
| 2014/0016703 A1 * | 1/2014 | Denoual | H04N 19/00696 375/240.16 |
| 2014/0247869 A1 | 9/2014 | Su | |
| 2015/0281732 A1 * | 10/2015 | Kim | H04N 19/503 375/240.12 |
| 2016/0029024 A1 * | 1/2016 | Shand | H04N 19/124 375/240.03 |

FOREIGN PATENT DOCUMENTS

| | | |
|---|---|---|
| JP | 2012-517764 | 8/2012 |
| KR | 10-2011-0115172 | 10/2011 |
| RU | 2459282 | 8/2012 |
| WO | 2009/127231 | 10/2009 |
| WO | 2010/105036 | 9/2010 |
| WO | 2012/004709 | 1/2012 |

* cited by examiner

ENCODING PERCEPTUALLY-QUANTIZED VIDEO CONTENT IN MULTI-LAYER VDR CODING

CROSS REFERENCE TO RELATED APPLICATIONS

This application claims priority from U.S. Provisional Patent Applications Nos. 61/805,388, filed on Mar. 26, 2013, and 61/861,555, filed on Aug. 2, 2013, each of which is hereby incorporated by reference in its entirety.

TECHNOLOGY

The present invention relates generally to image processing, and in particular, to encoding, decoding, and representing perceptually-quantized video.

BACKGROUND

Multiple layers may be used to deliver video data from an upstream device such as a multi-layer video encoder to downstream devices. For example, visual dynamic range (VDR) video data is carried in the combination of a base layer and an enhancement layer (EL) of the multiple layers for viewing experience of VDR displays.

BL image data may be encoded with low or partial dynamic range image data derived from VDR images. In the low or partial dynamic range image data, out-of-bound code words mapped from the VDR images may be clipped into a target represented range. Textual variations and image details represented in the VDR images may be lost in the low or partial dynamic range image data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1A:
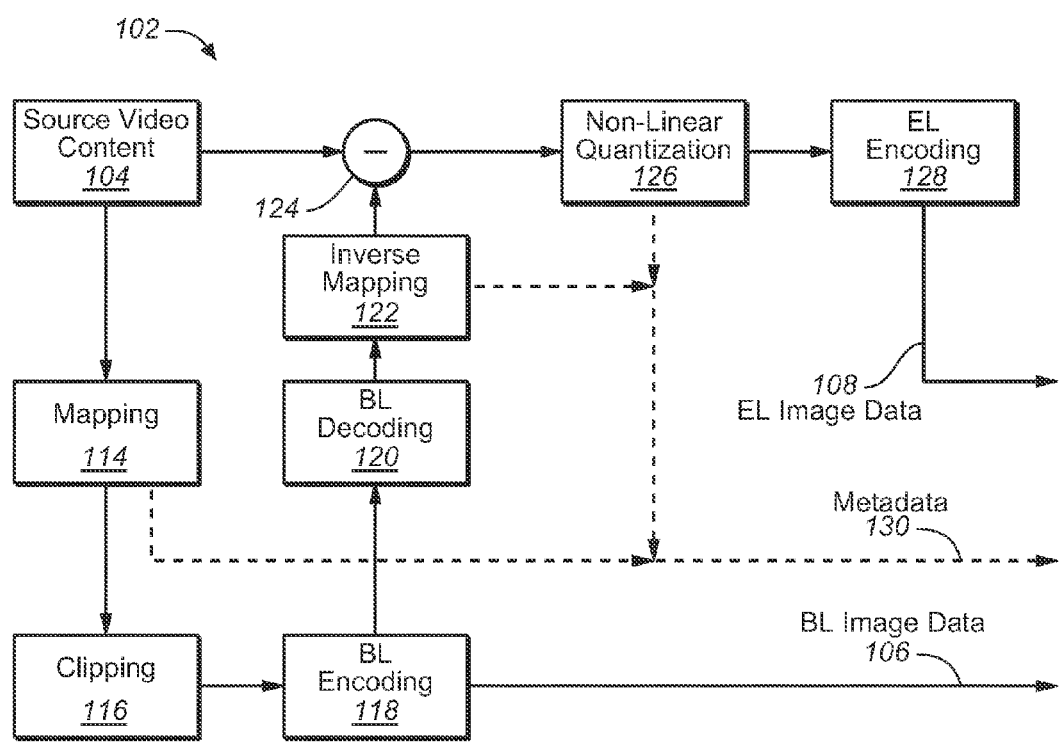
FIG. 1A illustrates a multi-layer video encoder, according to an embodiment of the invention.

Example embodiments, which relate to encoding, decoding, and representing variable dynamic range images including perceptually quantized base layer image data using a multi-layer codec, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. ENCODING AND DECODING VIDEO CONTENT
3. ALLOCATING AVAILABLE CODE WORDS BASED ON IMAGE CONTENT
4. MULTI-LAYER VIDEO ENCODING
5. MULTI-LAYER VIDEO DECODING
6. PRESERVATION OF VISUAL DETAILS IN BL IMAGE DATA
7. EXAMPLE DETERMINATION OF EXPONENT VALUE IN POWER FUNCTION
8. EXAMPLE DETERMINATION OF PARAMETER VALUES IN LINEAR QUANTIZATION INCLUDING PIECEWISE LINEAR QUANTIZATION
9. EXAMPLE PROCESS FLOWS
10. IMPLEMENTATION MECHANISMS—HARDWARE OVERVIEW
11. EQUIVALENTS, EXTENSIONS, ALTERNATIVES AND MISCELLANEOUS

1. General Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below.

In some embodiments, multi-layer codecs may be used to generate or process a media signal comprising compressed images (e.g., video images) for a wide variety of displays (e.g., VDR displays, etc.). To provide superior visual quality on a wide variety of wide and narrow dynamic range displays, video content to be released to downstream devices can be quantized and encoded by a multi-layered codec implementing perceptual quantization (PQ) techniques as described herein. Such video content as rendered by the downstream devices exhibits dramatically different visual characteristics from those exhibited by other techniques.

As used herein, the term "multi-layer codec" may refer to a multi-layer encoder or decoder that implements a structure of multiple layers in an audio visual signal (e.g., a bitstream, a broadcast signal, a media file, etc.). The multiple layers comprise a base layer and one or more enhancement layers. The base and enhancement layers comprise image data derived from the same (e.g., perceptually encoded, etc.) source images. Image data in the base layer contains compressed image data of a low or partial dynamic range, which may not be optimized for rendering on displays of a relatively narrow dynamic range such as a standard dynamic range or SDR. Image data in the multiple layers in combination contains compressed images of a wide dynamic range, which can be decoded and viewed on displays of a relatively wide dynamic range such as a visual dynamic range or VDR. The term "VDR" or "visual dynamic range" as used herein may refer to a dynamic range wider than a standard dynamic range, and may include, but is not limited to, a wide dynamic range up to the instantaneously perceivable dynamic range and color gamut which human vision can perceive at an instant.

A multi-layer codec as described herein may be implemented with two or more lower bit depth (e.g., 8 bits, etc.) codecs (e.g., gamma-domain codecs, etc.) in the multiple layers in order to support higher bit depth (e.g., 12+ bits, etc.) images in the multiple layers as a whole and to support lower bit depth (e.g., 8 bits, etc.) images in the base layer. For example, one or more gamma-domain encoders can be deployed in a BL signal processing path and/or in one or more EL signal processing paths of a multi-layer encoder as described herein. In some embodiments, at least one gamma-domain decoder can be deployed in the BL signal processing path of a downstream device that is a base-layer only decoder.

The PQ techniques as described herein can be used to enable gamma-domain codecs to preserve visual details of original perceptually-encoded video content. Instead of requiring a PQ-to-gamma format converter at the video encoder side and a gamma-to-PQ format converter at the decoder side, techniques as described herein enable gamma-domain codecs in a multi-layer encoder, a multi-layer decoder, a base-layer decoder, etc., to directly preserve visual details of perceptually encoded video content without those format converters. Perceptually quantized video signals that preserve these visual details in both wide and narrow dynamic ranges can be provided by a multi-layer encoder to downstream devices directly without employing a PQ-to-gamma format conversion. Similarly, perceptually quantized video signals as received by a downstream device can be decoded and/or rendered with the preserved visual details by the downstream device directly without employing a gamma-to-PQ format conversion. Consequently, computation complexity, coding efficiency, and perceptual quality can all be significantly improved under the techniques as described herein.

Codecs implementing techniques as described herein may be further configured to include inter-layer prediction capabilities to fully exploit statistical redundancy between base layer (BL) image data and original input image data. EL image data may (possibly only) carry residual (or differential) image data, instead of carrying a large amount of wide dynamic range image data without exploiting correlations and statistical redundancy in image data of different layers.

In some example embodiments, data needed for other applications (including but not limited to those not related to perceptual encoding operations, etc.) may also be included with base layer and enhancement layer image data to be delivered from an upstream device to a downstream device. In some example embodiments, additional features and/or orthogonal features may be supported by the base and enhancement layers as described herein.

In some example embodiments, mechanisms as described herein form a part of a media processing system, including but not limited to any of: a handheld device, game machine, television, laptop computer, netbook computer, tablet computer, cellular radiotelephone, electronic book reader, point of sale terminal, desktop computer, computer workstation, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Encoding and Decoding Video Content

Human vision may not perceive a difference between two luminance levels if the two luminance levels are not sufficiently different from each other. Instead, human vision only perceives a difference if the luminance levels differ no less than a just noticeable difference (JND). Due to perceptual nonlinearity of human vision, the amounts of individual JNDs are not uniformly sized or scaled across a range of luminance levels, but rather vary with different individual luminance levels.

Techniques (e.g., algorithms, etc.) as described herein can be used by a multi-layer encoder to encode source video content into a multi-layer video signal that preserves visual details of the source video content in BL image data as well as in the combination of BL and EL image data. In some embodiments, the source video content is originally encoded with the source code words in a source encoding format (e.g., as defined by a VDR specification, etc.) based on perceptual encoding techniques (e.g., VDR encoding techniques developed by Dolby Laboratories, Inc., San Francisco, Calif., etc.). In some embodiments, the source code words in the source encoding format represent luminance levels distributed in such a way that the luminance levels are optimally spaced or quantized to match the perceptual nonlinearity of human vision.

The multi-layer video signal generated by a multi-layer encoder as described herein can be transmitted directly or indirectly to or received by a wide variety of downstream devices including but not limited to, any of: display systems with multi-layer decoders, display systems with base-layer decoders, etc.

A downstream device (e.g., a multi-layer decoder, etc.) that supports relatively wide dynamic range display operations can derive and/or render a wide dynamic range version of the source video content based on the received multi-layer video signal. The decoded wide dynamic range version of the source video content represents targeted luminance levels (e.g., device-specific luminance levels, etc.) that approximate the luminance levels represented by the source code words in the source video content.

A downstream device (e.g., a BL decoder, etc.) that supports relatively narrow dynamic range display operations can derive and/or render a decoded narrow dynamic range version with visual details of the source video content based on BL image data of the received multi-layer video signal. The decoded narrow dynamic range version of the source video content represents targeted luminance levels (e.g., device-specific luminance levels, etc.) that are mapped from the luminance levels represented by the source code words in the source video content, albeit within a relatively narrow dynamic range supported by the downstream device.

While the decoded narrow dynamic range version and the decoded wide dynamic range version of the source video content both represent targeted luminance levels (e.g., device-specific luminance levels, etc.) that are mapped from the luminance levels represented by the source code words in the source video content, the decoded narrow dynamic range version of the source video content may comprise more errors (e.g., quantization errors due to a relatively low bit depth, clippings at low or high luminance levels, etc.) than the decoded wide dynamic range version of the source video content, in comparison with the luminance levels represented by the source code words in the source video content.

3. Allocating Available Code Words Based on Image Content

A video codec without using techniques as described herein allocates available code words at a particular bit depth (e.g., 8 bits, etc.) in a manner that does not preserve visual details of originally perceptually encoded source video content. For example, a media device comprising a gamma-domain codec without using techniques as described herein may over-allocate code words to high luminance sub-ranges (e.g., bright portions, highlights, etc.) in a device-specific dynamic range and under-allocate code words to a low luminance sub-range (e.g., dark portions, dark areas, etc.) in the device-specific dynamic range. As a result, visual details of perceptually encoded source video content are unnecessarily lost under these other techniques.

A video codec in a multi-layer codec under techniques as described herein allocates available code words at a particular bit depth (e.g., 8 bits, etc.) in a way that preserves visual details of perceptually encoded source video content, as compared with a video codec without using these techniques. As a result, perceptual details in source video content are better preserved in the multi-layer codec as described herein than other video codecs without using these techniques.

Under techniques as described herein, a multi-layer codec selects/determines specific parameter values (e.g., exponent values in power functions, slopes in linear quantization, pivots in piecewise linear quantization, etc.) based on image content carried by image frames (e.g., in a scene, etc.) in source video content. If the image content comprises more highlight portions or more luminance levels, the parameter values can be selected/determined to cause more represented luminance levels in the high luminance sub-range to be available for encoding or decoding operations. If the image content comprises fewer highlight portions or fewer luminance levels, the parameter values can be selected/determined to cause fewer represented luminance levels in the high luminance sub-range to be available for encoding or decoding operations. Similarly, if the image content comprises more dark portions or more luminance levels, the parameter can be selected/determined to cause more represented luminance levels in the low luminance sub-range to be available for encoding or decoding operations. If the image content comprises fewer dark portions or fewer luminance levels, the parameter values can be selected/determined to cause fewer represented luminance levels in the low luminance sub-range to be available for encoding or decoding operations.

4. Multi-Layer Video Encoding

Figure 1B:
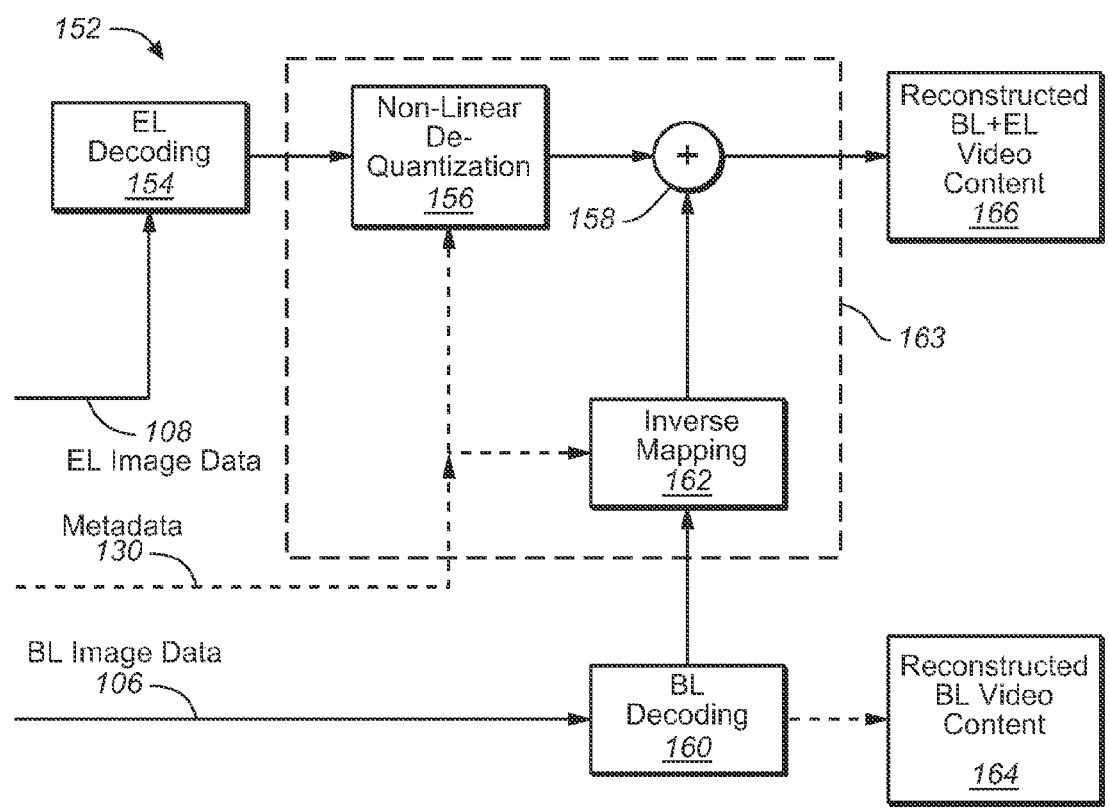
FIG. 1B illustrates a multi-layer video decoder, according to an embodiment of the invention.

As previously noted, a multi-layer video signal (e.g., coded bitstream, etc.) comprising a base layer and one or more enhancement layers can be used by an upstream device (e.g., a multi-layer encoder 102 of FIG. 1A) to deliver video content encoded to downstream devices (one of which may be, for example, a multi-layer decoder 152 of FIG. 1B, etc.). In some embodiments, the video content delivered by the multiple layers comprises BL image data (e.g., 106 of FIG. 1A, FIG. 1B, etc.) of a relatively low bit depth and EL image data (e.g., 108 of FIG. 1A, and FIG. 1B, etc.) complementary to the BL image data. Both the BL image data (106) and the EL image data (108) are derived/quantized from the relatively high bit depth (e.g., 12+ bit VDR, etc.) source video content (104).

In some embodiments, the BL image data (106) is placed in a base layer container (e.g., an 8-bit YCbCr 4:2:0 container, etc.). In some embodiments, the EL image data (108) comprises residual image data of the (e.g., VDR, etc.) source video content (104) relative to predicted image data generated from the BL image data (106). In some embodiments, the EL image data (108) is placed in one or more enhancement layer containers (e.g., one or more 8-bit residual data containers, etc.). The BL image data (106) and the EL image data (108) may be received and used by the downstream devices (e.g., 152 of FIG. 1B, etc.) to reconstruct a relatively high bit depth (e.g., 12+ bits, etc.) decoded version (e.g., a perceptually decoded VDR version, etc.) of the (e.g., VDR, etc.) source video content (104).

As used herein, the term "bit depth" refers to the number of bits provided in a coding space that provides available code words to encode or quantize image data; an example of low bit depth is 8 bits; an example of high bit depth is 12 bits or more. In particular, the term "a low bit depth" or "a high bit depth" does not refer to the least significant bits or the most significant bits of a code word.

In an example embodiment, the multi-layer encoder (102) is configured to receive the (e.g., VDR, etc.) source video content (104) comprising a sequence of input VDR images. The sequence of input VDR images represents one or more scenes each of which comprises a plurality input images in the sequence of VDR images. As used herein, an "input VDR image" generally refers to wide or high dynamic range image data that may be used to derive a VDR version of a source image (e.g., a scene-referred image captured by a high-end image acquisition device, etc.). An input VDR image may be in any color space that supports a high dynamic range color gamut. In some embodiments, the input VDR image is the only input, relative to the source image, that provides image data for the VDR image encoder (102) to encode; input image data, relative to the source image, for base layer processing under techniques as described herein may be generated based on the input VDR image using perceptual quantization techniques.

In an example embodiment, an input VDR image decoded from the (e.g., VDR, etc.) source video content (104) is a 12+ bit YCbCr image in a YCbCr color space. In an example, each pixel represented in the input VDR image comprises code words for all channels (e.g., luminance channel Y, chroma channels Cb and Cr, etc.) defined for a color space (e.g., a YCbCr color space). Each code word comprises upsampled or downsampled code words for one or more of the channels in the color space.

In an example embodiment, the multi-layer encoder (102) is configured to transform code words of an input VDR image from a first color space (e.g., an RGB color space, etc.) to a second different color space (e.g., a YCbCr color space, etc.).

In an example embodiment, the multi-layer encoder (102) is configured to downsample or upsample an input VDR image in a first sampling format (e.g., in a 4:4:4 sampling format, etc.) to a second different sampling format (e.g., in a 4:2:0 sampling format, etc.).

In an example embodiment, the multi-layer encoder (102) is configured to perform operations related to perceptual quantization on the source video content (104) to generate the (e.g., 8-bit, etc.) BL image data (106). The operations related to perceptual quantization include but are not limited to one or more of: mapping operations (114), clipping operations (116), BL encoding operations (118), etc.

In the mapping operations (114), the multi-layer encoder (102) is configured to use a mapping function to map (e.g., 12 bit+, etc.) input VDR code words (e.g., VDR luminance code words $v^Y$, VDR chroma code words $v^C$, etc.) in one or more input VDR images in the (e.g., VDR, etc.) source video content (104) into mapped code words (e.g., mapped luminance code words $c^Y$, mapped chroma code words $c^C$, etc.) in one or more mapped images corresponding to the one or more VDR images.

In the clipping operations (116), the multi-layer encoder (102) is configured to clip mapped code words that are either below a minimum value or above a maximum value. The number (e.g., <=256 at a bit depth of 8 bits, etc.) of available code words at the bit depth of the BL image data (106) may not be large enough to accommodate the entire numeric range of the unclipped mapped code words. Thus, some of the highest mapped code words and/or lowest mapped code words in the one or more mapped images may be clipped to the maximum value and/or the minimum value in the clipping operation (116). The multi-layer encoder (102) is configured to determine/select, based on the one or more mapped images and one or more factors, optimal minimum and maximum values. The one or more factors include but are not limited to minimizing the number of mapped code words that need to be clipped, maximizing the represented/perceptual details of one or more (e.g., salient, central, etc.) portions of the one or more mapped images after the clipping operations, etc.

In the BL encoding operations (118), the multi-layer encoder (102) is configured to determine an optimal exponent value of a power function used by a BL codec in the multi-layer encoder (102) to map source code words (e.g., $v^Y$, etc.) to corresponding mapped code words (e.g., $c^Y$, etc.) in a specific channel (e.g., a luminance channel or a Y channel, etc.) of a color space (e.g., a YCbCr color space, etc.). In some embodiments, the multi-layer encoder (102) is configured to determine parameter values of piecewise-linear (PWL) mapping functions used by the BL codec to map source code words (e.g., $v^C$, etc.) to corresponding mapped code words (e.g., $c^C$, etc.) in a specific channel (e.g., a chroma channel or a Cb/Cr channel, etc.) of a color space (e.g., a YCbCr color space, etc.).

In the BL encoding operations (118), the multi-layer encoder (102) is configured to map/compress, based on the exponent value of the power function and/or the parameter values of PWL mapping functions, the source code words decoded from the source video content (104) to the mapped code words and format the mapped code words. Some of the mapped code words are clipped. Some or all of the mapped code words contain quantization errors caused by mapping high bit depth VDR code words to low bit depth mapped code words. The multi-layer encoder (102) is further configured to format the (e.g., 8 bit, etc.) BL image data (106) into one or more (e.g., 8-bit, etc.) BL image containers in a (e.g., 4:2:0, etc.) sampling format.

In an example embodiment, the multi-layer encoder (102) outputs the BL image data (106) in the BL image containers as a part of multi-layer video signal to a downstream device (e.g., the multi-layer decoder 152 of FIG. 1B, etc.).

In an example embodiment, the multi-layer encoder (102) is configured to perform one or more EL operations. The one or more EL operations include but are not limited to, any of: BL decoding operations (120), inverse mapping operations (122), subtraction operations (124), nonlinear quantization operators (126), EL encoding operations (128), etc.

In the BL decoding operations (120), the multi-layer encoder (102) is configured to decode the (e.g., 8 bit, etc.) BL image data (106) in the (e.g., 8-bit, etc.) BL image containers back into mapped code words in one or more mapped images that correspond to the one or more input VDR images.

In the inverse mapping operations (122), the multi-layer encoder (102) is configured to inversely map, based on one or more lookup tables (LUTs), the mapped code words into VDR code words. The LUTs used for inverse mapping can be derived analytically or numerically from the power function with the previously determined exponent values and/or the PWL mapping functions with the previously determined parameter values.

In some embodiments, some or all of these LUTs comprise lookup keys (e.g., mapped code words, etc.) and lookup values (e.g., VDR code words, etc.) corresponding to the lookup keys. For example, for the purpose of illustration only, an inverse 1D LUT, which may be used to inversely map mapped code words to VDR code words, can be constructed by substituting $s_i$=[0, 1, 2, . . . 255] to the following expression:

$$LUT(s_i) = (v_H - v_L)\left(\frac{\text{clip}(s_i, c_L, c_H) - c_L}{c_H - c_L}\right)^{1/\alpha} + v_L \qquad (1)$$

where $c_L$ and $c_H$ are minimum and maximum values, respectively, of the mapped code words in the luminance channel as determined in the mapping operations and/or the clipping operations; $v_L$ and $v_H$ are minimum and maximum values, respectively, of the VDR code words in the luminance channel as determined in the mapping operations and/or the clipping operations; and clip( . . . ) is a clipping function to ensure that any out-of-range (e.g., out of the range [cL, cH], etc.) code word after lossy compression (which can occur, for example, in the BL encoding operations, etc.) can still be inversely mapped to the closest valid VDR code word.

Other types of LUTs (e.g., PWL-based, etc.) can also be constructed numerically in a similar manner. Each of the LUTs as described herein may be used to inversely map mapped code words decoded from the BL image data (106) to corresponding VDR code words in one or more specific channels of the applicable color space.

In some embodiments, the multi-layer encoder (102) is configured to implement BL-to-EL prediction (e.g., intra and/or inter prediction, etc.) in order to reduce the amount of EL image data that needs to be carried in the EL layers for reconstructing VDR images by a downstream device (e.g., a multi-layer decoder 152 of FIG. 1B, etc.). The multi-layer encoder (102) can generate, based at least in part on the VDR code words obtained through the inverse mapping operations (122), prediction image data.

In the subtraction operations (124), the multi-layer encoder (102) is configured to generate residual values between the VDR code words decoded from the source video content (104) and the VDR code words represented in the prediction image data. Residual values in a specific channel (e.g., a luminance channel, a Y channel, etc.) may be differences produced by the subtraction operations (124) in a logarithmic domain or in a linear domain.

In the non-linear quantization operations (126), the multi-layer encoder (102) is configured to quantize the residual values in a first digital representation (e.g., 12+ bit, etc.) to a second digital representation (e.g., 8-bit, etc.) in a color space (e.g., YCbCr, etc.) using one or more NLQ parameters.

In the EL encoding operations (128), the multi-layer encoder (102) is configured to encode the (e.g., 8-bit, etc.) residual values as generated by the non-linear quantization operations, into the EL image data (108) in an (e.g., 8-bit, etc.) EL image container in a (e.g., 4:2:0, etc.) sampling format. The EL image container in the enhancement layer may be logically separate from the BL image container in the base layer, even though both image containers can be concurrently contained in a single digital video signal (e.g., a single coded bitstream, a single media file, a single broadcast, etc.).

In an example embodiment, the multi-layer encoder (102) outputs the EL image data (108) in the EL image containers as a part of multi-layer video signal to a downstream device (e.g., the multi-layer decoder 152 of FIG. 1B, etc.).

In an example embodiment, the multi-layer encoder (102) outputs metadata (130) comprising some or all of operational parameters used in the operations of the multi-layer encoder (102) as a part of multi-layer video signal to a downstream device (e.g., the multi-layer decoder 152 of FIG. 1B, etc.). The operational parameters in the metadata (130) transmitted to downstream devices include but are not limited to, any of: one or more of mapping parameters, clipping parameters, exponent values used in power functions for gamma compression, inverse mapping parameters, LUTs, pivot values in PWL functions, non-linear quantization parameters, etc., by mapping parameters (134) and the NLQ parameters (132), etc. The metadata (130) may be a part of data carried in the EL layers and/or the BL layer, or in a separate sub-bitstream of an overall video bitstream, for example, as a part of supplemental enhancement information (SEI) or other similar metadata carriages available in the video bitstream. An example sub-bitstream may be a reference processing unit (RPU) stream developed by Dolby Laboratories, Inc.

For example, the LUTs used in the inverse mapping operations (122) may be transmitted to downstream devices as a part of the metadata (130). In some embodiments, lookup keys and values corresponding to the lookup keys in a LUT are transmitted to downstream devices as a part of the metadata (130). In some embodiments, at least one LUT may be representable by an analytic function or a multi-segment analytic function. Instead of transmitting lookup keys and values corresponding to the lookup keys in the LUT to downstream devices, parameters defining the analytic function are sent to the downstream devices as a part of the metadata (130), in order to reduce the amount of the metadata (130) in transmission. In some embodiments, parameters in a mapping function used to numerically derive a LUT are transmitted to downstream devices as a part of the metadata (130), instead of transmitting lookup keys and values corresponding to the lookup keys in the LUT. A downstream device can use the parameters to derive the LUT as illustrated with expression (1). A video codec specification governing encoding and decoding operations may comprise syntactic elements to pass one or more of parameters as described herein from an upstream device (e.g., the multi-layer encoder 102, etc.) to downstream devices (e.g., the multi-layer decoder 152, etc.).

The EL image data (108), the BL image data (106) and the metadata can be used by the downstream device to generate a decoded version of relatively wide dynamic range (e.g., VDR, HDR, etc.) images that represent the relatively wide dynamic range input images in the source video content (104).

One or more of the operations such as the BL encoding operations (118), the BL decoding operations (120), the EL encoding operations (128), etc., may be implemented using one or more of a plurality of codecs, including, but not limited to, any combination of: H.264/AVC/HEVC, MPEG-2, VP8, VC-1, and/or others.

5. Multi-Layer Video Decoding

A multi-layer video signal (e.g., coded bitstream, etc.) comprising video content can be received by a multi-layer decoder (e.g., 152 of FIG. 1B, etc.). In some embodiments, the video content received by the multi-layer decoder (152) comprises BL image data (e.g., 106 of FIG. 1A, FIG. 1B, etc.) of a relatively low bit depth and EL image data (e.g., 108 of FIG. 1A and FIG. 1B, etc.). In some embodiments, both the BL image data (106) and the EL image data (108) are derived/quantized from the relatively high bit depth (e.g., 12+ bit VDR, etc.) source video content (e.g., 104 of FIG. 1A, etc.). In some embodiments, the multi-layer decoder (152) is configured to receive metadata (130) comprising some or all of operational parameters used in operations that generate the BL image data (106) and the EL image data (108) as a part of the multi-layer video signal.

In some embodiments, the BL image data (106) is placed in a base layer container (e.g., an 8-bit YCbCr 4:2:0 container, etc.). In some embodiments, the EL image data (108) comprises residual image data of the (e.g., VDR, etc.) source video content (104) relative to predicted image data generated from the BL image data (106). In some embodiments, the EL image data (108) is placed in one or more enhancement layer containers (e.g., one or more 8-bit residual data containers, etc.).

In an example embodiment, the multi-layer decoder (152) is configured to perform PQ-based decoding operations on the BL image data (106) and the EL image data (108) to generate one or more wide dynamic range (e.g., VDR, etc.) images that represents a reconstructed version (e.g., reconstructed BL+EL video content 166, etc.) of source images in source video content that was used to generate the multi-layer video signal. The PQ-based decoding operations include but are not limited to one or more of: BL decoding operation (160), inverse mapping operations (162), EL decoding operations (154), non-linear de-quantization operations (156), addition operations (158), etc.

In the BL decoding operations (160), the multi-layer decoder (152) is configured to decode the (e.g., 8 bit, etc.) BL image data (106) in the (e.g., 8-bit, etc.) BL image containers into mapped code words in one or more mapped images (e.g., tone-mapped images).

In the inverse mapping operations (162), the multi-layer decoder (152) is configured to inversely map—for example, based on one or more lookup tables (LUTs) decoded from the metadata (130)—the mapped code words into VDR code words. In some embodiments, the multi-layer decoder (152) is configured to directly receive the LUTs in the metadata (130) in terms of lookup keys and values corresponding to the lookup keys. In some embodiments, the multi-layer decoder (152) is configured to receive parameter values such as one or more exponent values, pivot-related values, etc., related to one or more functions and to use the parameter values and the one or more functions to generate (e.g., numerically, etc.) the one or more LUTs (e.g., lookup keys and values corresponding to the lookup keys, etc.) to apply in the inverse mapping operations (162).

In the EL decoding operations (154), the multi-layer encoder (152) is configured to generate (e.g., 8-bit, etc.) residual values by decoding the EL image data (108), which may be in an (e.g., 8-bit, etc.) EL image container in a (e.g., 4:2:0, etc.) sampling format.

In the non-linear de-quantization operations (156), the multi-layer decoder (152) is configured to de-quantize the residual values in a relatively low bit depth digital representation (e.g., 8-bit, etc.) as decoded to a relatively high bit depth digital representation (e.g., 12+ bit, etc.) in a (e.g., YCbCr, etc.) color space using one or more NLQ parameters decoded from the metadata (130).

In the addition operations (158), the multi-layer decoder (152) is configured to generate the reconstructed version of one or more wide dynamic range images based on the residual values generated in the EL decoding operations (154) and the VDR code words generated in the inverse mapping operations (162). The reconstructed version of the one or more wide dynamic range images can be outputted to and/or rendered on a display panel, for example, by a (e.g., HDR, VDR, etc.) display system that operates with or includes the multi-layer decoder (152).

In some embodiments, the multi-layer decoder (152) is configured to implement BL-to-EL prediction (e.g., intra and/or inter prediction, etc.) in order to reduce the amount of EL image data that needs to be carried in the EL layers for reconstructing VDR images by the multi-layer decoder (152). The multi-layer decoder (152) can generate, based at least in part on the VDR code words obtained through the inverse mapping operations (122), prediction image data that comprise the VDR code words to be used in the addition operations (158).

In some embodiments, components or modules used in the inverse mapping (162) or the BL decoding operations (160) of the multi-layer decoder (152) may be the same or substantially the same as those used in the inverse mapping (120) or the BL decoding operations (118) of the multi-layer encoder (102).

One or more of the operations performed by the multi-layer decoder (152) may be implemented using one or more of a plurality of codecs, including, but not limited to, any combination of: H.264/AVC/HEVC, MPEG-2, VP8, VC-1, and/or others.

In some embodiments, non-linear de-quantizer (156), inverse mapping (162), and adder (158) may be part of a composer unit (163). Without limitation, in an embodiment, composer unit (163) may be implemented using processor-readable instructions running on a processor, or using dedicated hardware, such as an FPGA and the like, or using a combination of general purpose and dedicated processors.

Figure 1C:
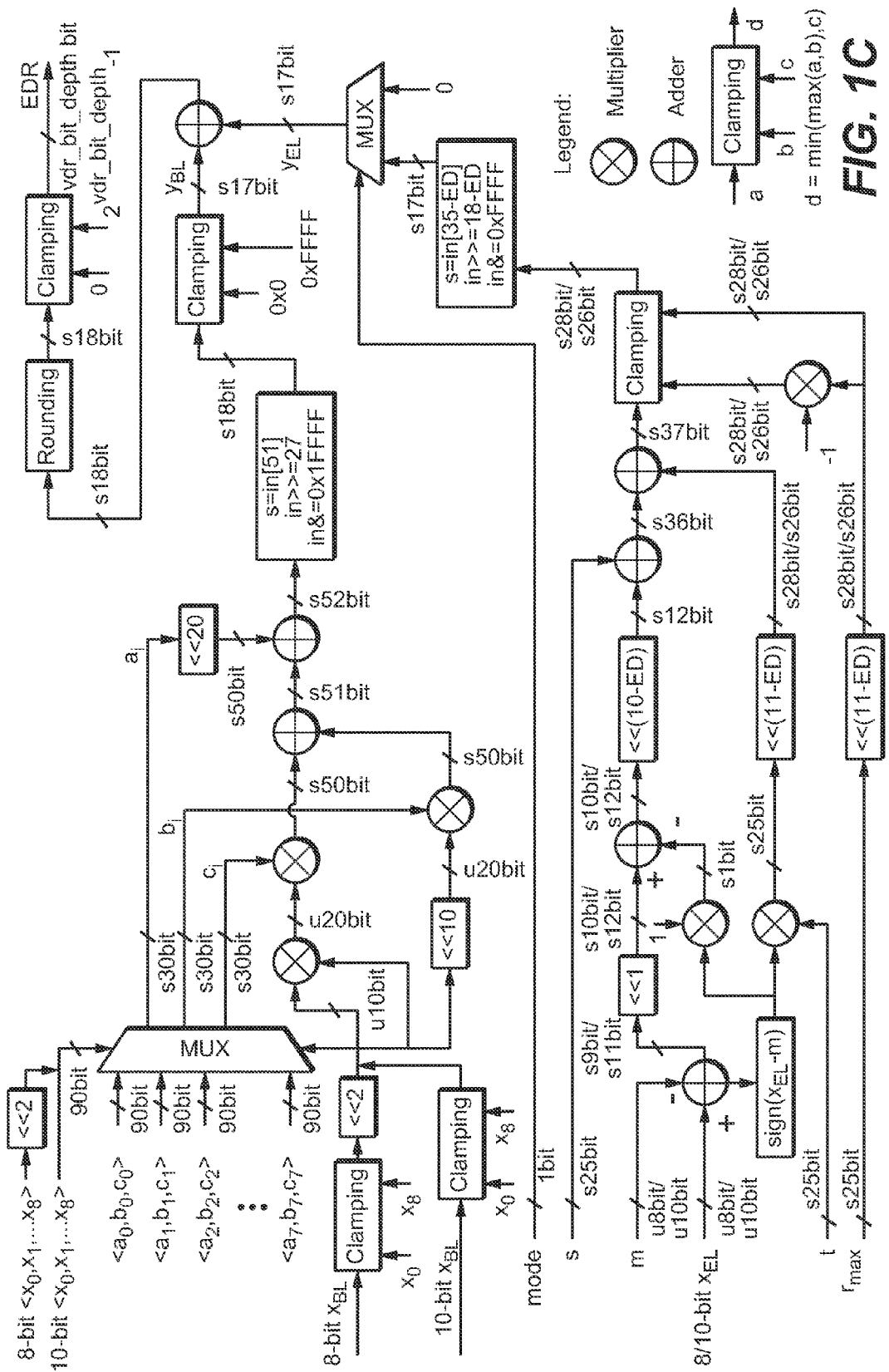
FIG. 1C and FIG. 1D illustrate fixed-point implementations of a composer unit in a decoder implemented according to embodiments of the invention.

FIG. 1C depicts the data flow for a "Base Profile" composer (163) implemented using fix-point arithmetic according to an embodiment of this invention. Given the prediction coefficients $a_i$, $b_i$, and $c_i$, inverse quantizer parameters s, m, $r_{max}$, and t, other metadata parameters (such as pivot values $x_i$), and input data $x_{BL}$ and $x_{EL}$, the composer operations can be expressed as:

```
BL_prediction( ) {
    y_BL=a_i+b_i*x_BL+c_i*x_BL^2;
    Clip3(0, 1.0, y_BL);
}
EL_inverse_quant( ) {
    y_EL=s*((x_EL-m)-0.5*sign(x_EL-m))
        + t*sign(x_EL-m);
    Clip3(-r_max, r_max, y_EL);
}
```

```
EDR_composing( ) {
    EDR = Round(y_BL+y_EL);
    Clip3(0, 2^vdr_bit_depth - 1, EDR);
}
```

Figure 1D:
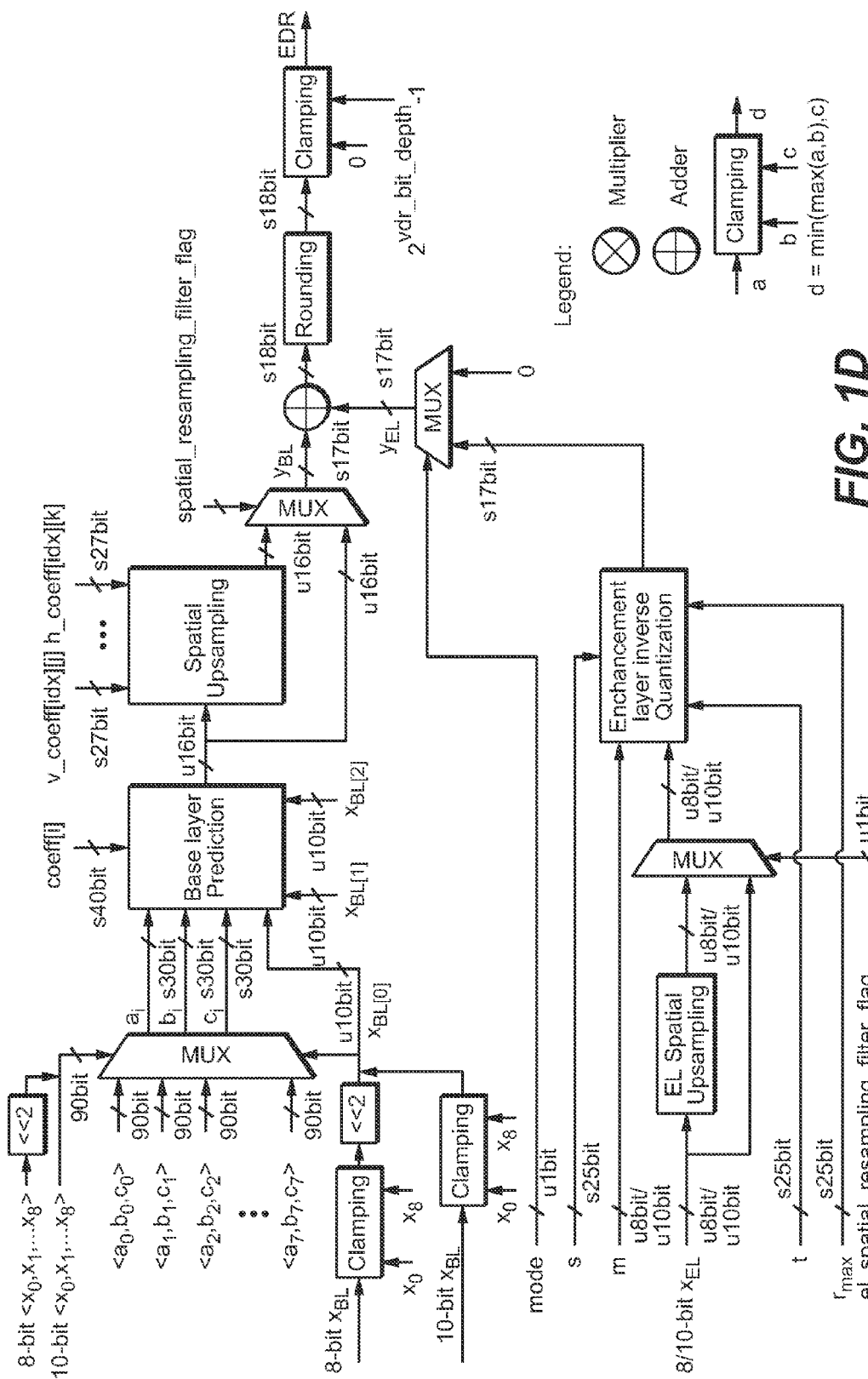

FIG. 1D depicts the data flow for a "Main Profile" composer (163) implemented using fix-point arithmetic according to another embodiment of this invention. In FIG. 1D, $x_{BL[0]}$ denotes a luma channel sample, while $x_{BL[1]}$ and $x_{BL[2]}$ denote chroma channel samples. For $x_{BL[0]}$, the prediction may be performed using second-order polynomials with coefficients $a_i$, $b_i$, and $c_i$, as depicted in FIG. 1C. For chroma samples, the prediction may be based either on second order polynomials or it may be based on a multiple-color channel multiple regression predictor (MMR), as described in PCT Application with Ser. No. PCT/US2012/033605, filed on Apr. 13, 2012, and incorporated herein by reference in its entirety.

The EL inverse quantization step depicted in FIG. 1D may be the same as the one depicted in more detail in FIG. 1C, using parameters (s, m, t, $r_{max}$). A fixed coefficient spatial up-sampling is in use if a corresponding flag (e.g., el_spatial_resampling_filter_flag) is set to 1. In an embodiment, a 2×2 up-sampling filter is being used with an 8-tap horizontal filter and a 6-tap vertical filter. Note also that EL spatial up-sampling and BL spatial up-sampling are mutually exclusive.

6. Preservation of Visual Details in Bl Image Data

For the purpose of illustration, in one or more of the mapping operations (114), the clipping operations (116), or the BL encoding operation (118), etc., the multi-layer encoder (102) is configured to use a power function with an exponent value (α) as a mapping function to map VDR luminance code words decoded from the source video content (104) to mapped luminance code words, which can be quantized and encoded into the BL image data (106). The power function may be represented in the following expression:

$$s_i = clip3\left(\text{round}\left((c_H - c_L)\left(\frac{v_i - v_L}{v_H - v_L}\right)^\alpha + c_L\right), c_L, c_H\right) \quad (2)$$

When the exponent value (α, which may be the same as that in expression (1)) is one (1), the above power function is reduced to a linear quantization mapping. When an available bit rate is high, the exponent value possibly can be set within a relatively large range as the blocky artifacts are less likely to occur with high bit rates. When an available bit rate is low, the exponent value possibly can be set within a relatively small range as the blocky artifacts are more likely to occur with low bit rates. A high exponent value causes the mapping function to allocate relatively more coded words to high luminance levels than to low luminance levels and can enable the BL image data (106) to contain more details in the highlight portions of reconstructed images with fewer compression artifacts. However, a high exponent value also tends to merge different (e.g., VDR, etc.) source code words into the same or very close compressed code words in the dark portions of the reconstructed images. In the worst case, a non-flat dark portion (e.g., with perceptible luminance variances, etc.) in the source video content becomes completely flat (e.g., with luminance variances close to 0 or below a just noticeable difference in human vision, etc.) in the reconstructed images, resulting in very prominent blocky artifacts.

To help prevent blocky artifacts, a multi-layer encoder (e.g., 102) as described herein can be configured with an upper bound, MAX_α, which the exponent value should not exceed. In some embodiments, this upper bound can be configured/set/determined depending on what bit rates are available for receiving a multi-layer video signal as described herein. The multi-layer encoder (e.g., 102) is configured to determine an optimal exponent value, as constrained by the upper bound, based on the source video content.

In some embodiments, an overall optimal exponent value can be selected for the entire scene, for a plurality of input VDR images, etc. For each input VDR image, an image-specific optimal exponent value can first be determined based on that input VDR image. The overall optimal exponent value for the scene can then be selected (e.g., the minimal exponent value, etc.) from one or more image-specific optimal exponent values for one or more input VDR images in the scene.

In some embodiments, an input VDR image can be divided into a plurality of VDR image blocks. Standard deviations among code words of image blocks are indications of respective amounts of texture in the image blocks. A non-zero standard deviation as described herein can be alternatively represented or determined with one of non-zero max-min differences (e.g., a difference between the maximum and minimum values in an image block, etc.), non-zero variances, smoothness measurement values each of which corresponds to a non-zero standard deviation or a non-zero variance, etc. Conversely, a zero standard deviation as described herein can be alternatively represented or determined with one of zero max-min differences, zero variances, smoothness measurement values each of which corresponds to a zero standard deviation or a zero variance, etc. A mapping-induced blocky artifact occurs when a VDR image block with non-zero standard deviation is mapped to a corresponding mapped image block comprising mapped coded words of a zero or very small standard deviation (e.g., a small fraction of JND, etc.). In some embodiments, a determination of a non-zero standard deviation in an image block (e.g., a VDR image block, a mapped image block, etc.) is equivalent to, or reduced to, a determination of a non-zero difference between the maximum and minimum values in that image block. Likewise, a determination of a zero standard deviation in an image block (e.g., a VDR image block, a mapped image block, etc.) is equivalent to, or reduced to, a determination of a zero difference between the maximum and minimum values. Here, a mapped image block captures compressed image data that may not be optimized for viewing on a SDR display.

7. Example Determination of Exponent Value in Power Function

Figure 2A:
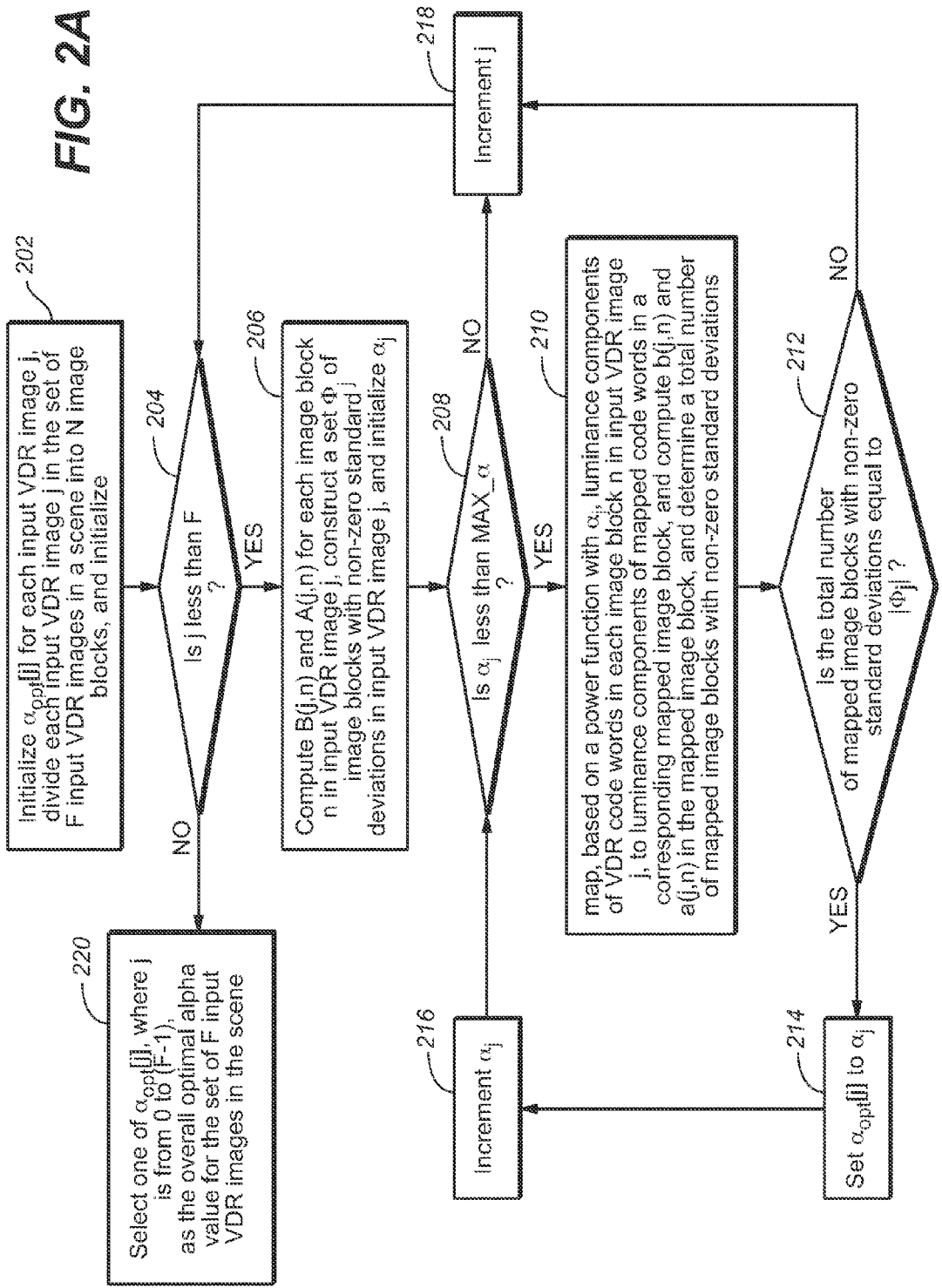
FIG. 2A and FIG. 2B illustrate example algorithms to search for optimal mapping parameter values, according to an embodiment of the invention.

In some embodiments, in one or more of the mapping operations (114), the clipping operations (116), or the BL decoding operation (118), etc., the multi-layer encoder (102) is configured to use a power function to map VDR code words (e.g., VDR luminance code words, etc.) decoded from the source video content (104) to mapped code words (e.g., mapped luminance code words, etc.), which can be quantized and encoded as a part of the BL image data (106). In some embodiments, a multi-layer encoder (e.g., 102) implements a fast search algorithm or a process flow to locate an optimal exponent value α of a power mapping function, as illustrated in FIG. 2A.

In block 202, the multi-layer encoder (102) performs initialization operations as follows. For each input VDR image j in a set of F input VDR images in a scene, the multi-layer encoder (102) initializes an optimal exponent value, $\alpha_{opt}[j]$, to 1.0. The multi-layer encoder (102) also divides each input VDR image in the set of F input VDR images in the scene into N image blocks. The multi-layer encoder (102) further sets j to a starting value, for example, 0.

In block 204, the multi-layer encoder (102) determines if j is less than F. If true, the process flow goes to block 206. If false, the process flow goes to block 220.

In block 206, for each image block n in input VDR image j, the multi-layer encoder (102) computes maximum and minimum luminance values B(j, n) and A(j, n) in that image block. A set $\Phi_j$ of image blocks with non-zero standard deviations in input VDR image j is constructed based on the following expression:

$$\Phi_j = \{n | B(j,n) - A(j,n) > 0\} \quad (3)$$

Additionally, the multi-layer encoder (102) initializes a local variable $\alpha_j$ to an initial value, for example, 1.0.

In block 208, the multi-layer encoder (102) determines if $\alpha_j$ is less than MAX_α. If true, the process flow goes to block 210. If false, the process flow goes to block 218.

In block 210, for each image block n in the set $\Phi_j$, the multi-layer encoder (102) maps, based on a power function with an exponent value as $\alpha_j$, VDR code words (e.g. VDR luminance code words, etc.) in that block to mapped code words (e.g. mapped luminance code words, etc.) in a corresponding mapped image block, and computes maximum and minimum values b(j, n) and a(j, n) in the mapped image block in a set of mapped image blocks derived from the set $\Phi_j$, as shown in the following expressions:

$$b_{jn}(\alpha_j) = \text{round}\left((c_H - c_L)\left(\frac{B(j,n) - v_L}{v_H - v_L}\right)^{\alpha_j} + c_L\right) \quad (4)$$

$$a_{jn}(\alpha_j) = \text{round}\left((c_H - c_L)\left(\frac{A(j,n) - v_L}{v_H - v_L}\right)^{\alpha_j} + c_L\right) \quad (5)$$

Subsequently, the multi-layer encoder (102) determines a total number of mapped image blocks with standard deviations greater than a threshold $T_\sigma$, as shown in the following expression:

$$\sum_{n \in \Phi_j} (b_{jn}(\alpha_j) - a_{jn}(\alpha_j) > T_\sigma) \quad (6)$$

where $T_\sigma$ can be set to one of: zero (0), a value close to zero, a fraction of a JND, an upper bound for quantization errors in the mapping operations, etc.

In block 212, the multi-layer encoder (102) determines if the total number of mapped image blocks with non-zero standard deviations equals the total number of elements in the set $\Phi_j$. If true, the process flow goes to block 214. If false, the process goes to block 218.

In block 214, the multi-layer encoder (102) sets $\alpha_{opt}[j]$ to $\alpha_j$.

In block 216, the multi-layer encoder (102) increments $\alpha_j$ by a positive increment, for example, 0.1. The process flow goes to block 208.

In block 218, the multi-layer encoder (102) increments j by 1. The process flow goes to block 204.

In block 220, the multi-layer encoder (102) selects one of $\alpha_{opt}[j]$, where j is from 0 to (F-1), as the overall optimal exponent value for the set of F input VDR images in the scene.

In some embodiments, the overall optimal exponent value is selected as the minimum value among $\alpha_{opt}[j]$, where j is from 0 to (F-1), as shown in the following expression:

$$\alpha = \min\{\alpha^{opt}[j]\} \qquad (7)$$

Using a power mapping function with an overall optimal exponent value as illustrated in expression (7) prevents, or reduces the likelihood of, mapping-induced completely flat image blocks from occurring in all images mapped from the set of F input VDR images.

In some other embodiments, the overall optimal exponent value may be a value close to but not necessarily the minimum value among $\alpha_{opt}[j]$, where j is from 0 to (F-1). Using a power mapping function with an overall optimal exponent value that is not the minimal may still cause one or more mapping-induced completely flat image blocks to occur in one or more of the images mapped from the set of F input VDR images.

An example algorithm listing for operations illustrated in FIG. 2A is shown in the following table:

TABLE 1

$\alpha^{opt}[j] = 1.0$ for all j.
// for each frame j within a scene
for( j = 0; j < F ; j++ ){
   // STEP 1.a : find the maximal value for each block n in VDR domain
   Calculate B(j, n) for all n
   // STEP 1.b : find the minimal value for each block n in VDR domain
   Calculate A(j, n) for all n
   // STEP 1.c : find blocks with (B(j, n) - A(j, n))> 0; i.e. non-zero std block index
   Construct $\Phi_j = \{n \mid B(j,n) - A(j,n) > 0\}$
   // STEP 2: calculate standard deviation for each block in BL domain with different $\alpha_j$
   for( $\alpha_j = 1.0$; $\alpha_j <$ MAX_$\alpha$ ; $\alpha_j$ +=0.1 ) {
      // STEP 2a: quantize B(j, n) in ($\Phi_j$ to BL using power function with $\alpha_j$ $$b_{jn}(\alpha_j) = \text{round}\left(\left(c_H - c_L\right)\left(\frac{B(j,n) - v_L}{v_H - v_L}\right)^{\alpha_j} + c_L\right)$$

// STEP 2b: quantize A(j, n) in $\Phi_j$ to BL using power function with $\alpha_j$ $$a_{jn}(\alpha_j) = \text{round}\left(\left(c_H - c_L\right)\left(\frac{A(j,n) - v_L}{v_H - v_L}\right)^{\alpha_j} + c_L\right)$$

// STEP 2c: calculate whether given $\alpha_j$ causes zero deviation $$\text{If}\left(\ |\Phi_j| - \sum_{n \in \Phi_j}(b_{jn}(\alpha_j) - a_{jn}(\alpha_j) > T_\sigma) == 0\right)$$

$\alpha^{opt}[j] = \alpha_j$
      else
         break;
   }
}
// STEP 3: find the minimal $\alpha^{opt}[j]$ as the final $\alpha$
$\alpha$ = min{ $\alpha^{opt}[j]$ }

8. Example Determination of Parameter Values in Linear Quantization Including Piecewise Linear Quantization In some embodiments, in one or more of the mapping operations (114), the clipping operations (116), or the BL decoding operation (118), etc., the multi-layer encoder (102) is configured to use a PWL mapping function (or a PWL quantizer) to map VDR code words (e.g., VDR chroma code words, etc.) decoded from the source video content (104) to mapped code words (e.g., mapped chroma code words, etc.), which can be quantized and encoded as a part of the BL image data (106). The PWL mapping function may comprise one or more segments each of which may be represented by the following expression (ignore rounding here) with different values for parameters m and b:

$$s_i = m(v_i - v_L) + b \qquad (8)$$

where m and b are slope and intercept parameters, and i is an index associated with an input variable $v_i$ (e.g., an i-th VDR chroma code word, etc.) and a mapped code word $s_i$ (e.g., a corresponding i-th mapped chroma code word, etc.).

The PWL mapping function can be reduced to a linear mapping function (e.g., linear quantization, a linear quantizer, etc.) when the total number of segments in the PWL mapping function is one (1).

A higher m in expression (8) produces more compression in mapped code words on the left-hand-side of expression (8), making blocky artifacts more likely to occur. To improve the coding efficiency, the final selected m and b may be the same within the entire scene. In some embodiments, either a single segment or a three-segment PWL mapping function may be used to map VDR code words (e.g., VDR chroma code words, etc.) to mapped coded words (e.g., mapped chroma code words, etc.) in a scene.

The use of a multi-segment PWL mapping function (e.g., a three segment PWL mapping function, etc.) allows a different linear quantizer (e.g., different values for m, etc.) to be applied to a different range of input VDR data (e.g., input VDR chroma code words, etc.). A first chroma range of input VDR data can be mapped with a first segment of a PWL mapping function. A second chroma range of the input VDR data can be mapped with a second segment of the PWL mapping function. A third chroma range of the input VDR data can be mapped with a third segment of the PWL mapping function. The best linear quantizer can be searched and determined for each of the multiple segments. An algorithm may be implemented to search for image-specific optimal parameter values for each input VDR image in a set of input VDR images in a scene, and then a consensus or overall optimal parameter values can be found among all the image-specific optimal parameter values of the input VDR images within the same scene.

Figure 2B:
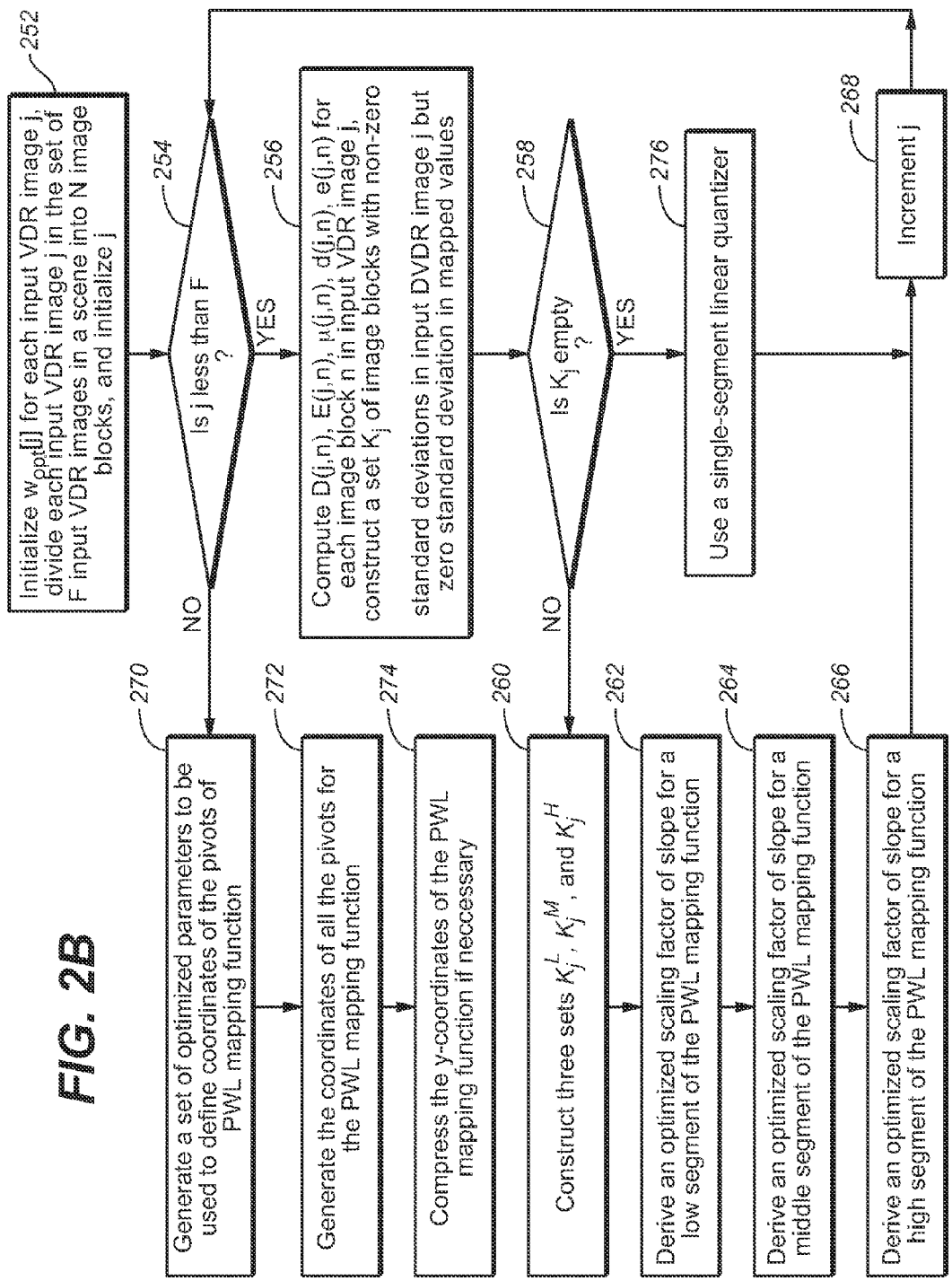

A PWL mapping function as described herein can be specified with pivot points. In some embodiments, a multi-layer encoder (e.g., 102) implements a fast search algorithm or a process flow to locate an optimal set of pivot points, as illustrated in FIG. 2B.

In block 252, the multi-layer encoder (102) performs initialization operations as follows. For each input VDR image j in a set of F input VDR images in a scene, the multi-layer encoder (102) initializes a slope scaling factor, $w^{opt}[j]$, to 1.0. The multi-layer encoder (102) may be configured to divide each input VDR image in the set of F input VDR images into N image blocks, or reuse the N image blocks as divided in each input VDR image in the set of F input VDR images in the scene in the process flow that has been used to search an optimal $\alpha$. The multi-layer encoder (102) further sets j to a starting value, for example, 0.

In block 254, the multi-layer encoder (102) determines if j is less than F. If true, the process flow goes to block 256. If false, the process flow goes to block 270.

In block 256, for each image block n in input VDR image j, the multi-layer encoder (102) computes maximum, minimum and average values D(j, n), E(j, n), µ(j, n) (e.g., in VDR chroma code words, etc.) in that image block. The multi-layer encoder (102) also computes mapped values $d_{jn}(w_j)$, $e_{jn}(w_j)$ (e.g., mapped chroma code words, etc.) corresponding to the maximum and minimum values D(j, n) and E(j, n) in that image block based on the following expressions (herein illustrated for a 8-bit base layer. If it is a 10-bit base layer, an example clipping function may be clip(x, 0, 1023)):

$$d_{jn}(w_j) = clip3\left(\left\lfloor w_j(C_H^Y - C_L^Y)\frac{v_H^C - v_L^C}{v_H^Y - v_L^Y}(D(j,n) - v_L^C) + C_r^C \right\rfloor, 0, 255\right) \quad (10)$$

$$e_{jn}(w_j) = clip3\left(\left\lfloor w_j(C_H^Y - C_L^Y)\frac{v_H^C - v_L^C}{v_H^Y - v_L^Y}(E(j,n) - v_L^C) + C_r^C \right\rfloor, 0, 255\right) \quad (11)$$

Where $C_H^Y$, $C_L^Y$, $v_H^Y$, $v_L^Y$, $v_H^C$, $v_L^C$, and $C_r^C$ are the maximum mapped luminance code word value, the minimum mapped luminance code word value, the maximum input VDR luminance code word value, the minimum input VDR luminance code word value, the maximum input VDR chroma code word value, the minimum input VDR chroma code word value, and a parameter in the linear relationships represented by the above expressions (10) and (11). The multi-layer encoder (102) constructs a set $K_j$ of image blocks with non-zero standard deviations in input VDR image j but with zero standard deviations in the corresponding mapped chroma code word values based on the following expression:

$$K_j = \{i | (D(j,n) - E(j,n) > 0) \ \&\& \ (d_{jn}(w_j) - e_{jn}(w_j) = 0)\} \quad (12)$$

In block 258, the multi-layer encoder (102) determines if the set $K_j$ is empty. If true, the process flow goes to block 276. If false, the process flow goes to block 260.

In block 276, the multi-layer encoder (102) is configured to use a single-segment linear quantizer for input VDR image j, and set parameters with the following expressions:

$$\mu_{min}(j) = v_L^C \quad (13)$$

$$\mu_{max}(j) = v_H^C \quad (14)$$

$$w_j^L = 1 \quad (15)$$

$$w_j^M = 1 \quad (16)$$

$$w_j^H = 1 \quad (17)$$

In block 260, the multi-layer encoder (102) finds minimum and maximum values of average values from the set $K_j$ in the following expressions:

$$\mu_{min}(j) = \min_{n \in K_j}\{\mu(j,n)\} \quad (18)$$

$$\mu_{max}(j) = \max_{n \in K_j}\{\mu(j,n)\} \quad (19)$$

The minimum and maximum values ($\mu_{min}(j)$ and $\mu_{max}(j)$) of the average values can be used to partition the entire range of input VDR chroma code word values between $v_L^C$ and $v_H^C$ into three segments: $[v_L^C, \mu_{min}(j)]$, $[\mu_{min}(j), \mu_{max}(j)]$, and $[\mu_{max}(j), v_H^C]$.

It should be noted that using expressions (18) and (19) to generate partitions for input VDR chroma code word values is for illustration purposes only. In other embodiments, more or fewer values (e.g., midpoints and/or fractional points between any two of these values, etc.) or segments can be used, for example, by generating more or fewer partitions from average, maximum or minimum input chroma code word values of the set of input images in the scene.

It should be noted that for the purpose of the invention, a set of input images may comprise a variable number of input images, and/or may or may not be related to a scene. For example, the process flows of FIG. 2A and FIG. 2B may be performed with a set of input images that belong to a subset of a scene. Also the process flows of FIG. 2A and FIG. 2B may be performed with a set of input images that do not belong to a single scene in other embodiments.

In block 260, the multi-layer encoder (102) can also be configured to construct three sets $K_j^L$, $K_j^M$, and $K_j^H$ of image blocks based on the following expressions:

$$K_j^L = \{n | v_L^C \leq \mu(j,n) < \mu_{min}(j), \forall n\} \quad (20)$$

$$K_j^M = \{n | \mu_{min}(j) \leq \mu(j,n) < \mu_{max}(j), \forall n \in K_j\} \quad (21)$$

$$K_j^H = \{n | \mu_{max}(j) \leq \mu(j,n) \leq v_H^C), \forall n\} \quad (22)$$

As illustrated, $K_j^M$ represents VDR image blocks, in the middle segment of the PWL mapping function, that have non-zero standard deviation in VDR chroma values but have zero standard deviations in mapped chroma values with the slope scaling factor, $w_j$, set to 1.0. $K_j^L$ represents VDR image blocks, in the low segment of the PWL mapping function, that have non-zero standard deviation in VDR chroma values. $K_j^H$ represents VDR image blocks, in the high segment of the PWL mapping function, that have non-zero standard deviation in VDR chroma values.

In block 262, the multi-layer encoder (102) is configured to set up an array $\Omega^L$ of candidate values for the slope scaling factor, $w_j$, to be used for the set $K_j^L$, as shown in the following expression:

$$\Omega^L = \{1, 1 - \Delta w, 1 - 2\Delta w, \ldots, 1 - (S^L - 1)\Delta w\} \quad (23)$$

where $\Delta w$ is a configurable or fixed decrement value and $S^L$ is a configurable or fixed number of array elements in $\Omega^L$.

For a local variable s in each integer value between 0 and $S^L$, the multi-layer encoder (102) uses expressions (10) and (11) to compute or re-compute mapped chroma values $d_{jn}(w_j)$ and $e_{jn}(w_j)$ corresponding to the maximum and minimum chroma values D(j, n) and E(j, n) for each image block with n in $K_j^L$, where the slope scaling factor, $w_j$, to be used for the set $K_j^L$ is set to a candidate value in $\Omega^L$, as shown in the following expression:

$$w_j = \Omega^L[s] \quad (24)$$

Additionally, for s in each integer value between 0 and $S^L$, the multi-layer encoder (102) computes a quantity $\pi^L(s)$ that compares the number (denoted as $|K_j^L|$) of elements in $K_j^L$ with the number of image blocks with standard deviations in mapped chroma values above a threshold value T, as shown in the following expression:

$$\pi^L(s) = \left(\left(\sum_{n \in K_j^L}((D_{jn}(w_j) - E_{jn}(w_j) > 0) \ \&\& \ (d_{jn}(w_j) - e_{jn}(w_j) == 0))\right) == 0\right) \quad (25)$$

Based on $\pi^L(s)$, an optimized scaling factor $w_j^L$ of slope for the low segment of the PWL mapping function can be derived with the following expressions:

$$w_j^L = \Omega^L(s_{opt}^L) \quad (26)$$

where $s_{opt}^L$ is given as follows:

$$s_{opt}^L = \underset{\{s\}}{\arg\min} s \quad (27)$$

s..t.

$$\sum_{u=s}^{S^L-1} \pi^L(u) = 0.$$

The processing as discussed above can be used to derive zero, one, two, or more other optimized scaling factors for zero, one, two, or more other segments of the PWL mapping function. For example, in block 264, the multi-layer encoder (102) is configured to set up an array $\Omega^M$ of candidate values for the slope scaling factor, $w_j$, to be used for the set $K_j^M$, as shown in the following expression:

$$\Omega^M = \{1, 1+\Delta w, 1+2\Delta w, \ldots, 1+(S^M-1)\Delta w\} \quad (28)$$

where $\Delta w$ is a configurable or fixed decrement value and $S^M$ is a configurable or fixed number of array elements in $\Omega^M$.

For a local variable s in each integer value between 0 and $S^M$, the multi-layer encoder (102) uses expressions (10) and (11) to compute or re-compute mapped chroma values $d_{jn}(w_j)$ and $e_{jn}(w_j)$ corresponding to the maximum and minimum chroma values $D(j, n)$ and $E(j, n)$ for each image block with n in $K_j^M$, where the slope scaling factor, to be used for the set $K_j^M$ is set to a candidate value in $\Omega^M$, as shown in the following expression:

$$w_j = \Omega^M[s] \quad (29)$$

Additionally, for s in each integer value between 0 and $S^M$, the multi-layer encoder (102) computes a quantity $\pi^M(s)$ that compares the number (denoted as $|K_j^M|$) of elements in $K_j^M$ with the number of image blocks with standard deviations in mapped chroma values above a threshold value T, as shown in the following expression:

$$\pi^M(s) = \quad (30)$$

$$\left( \left( \sum_{n \in K_j^M} ((D_{jn}(w_j) - E_{jn}(w_j) > 0) \,\&\&\, (d_{jn}(w_j) - e_{jn}(w_j) == 0)) \right) == 0 \right)$$

Based on $\pi^M(s)$, an optimized scaling factor $w_j^M$ of slope for the middle segment of the PWL mapping function can be derived with the following expressions:

$$w_j^M = \Omega^M(s_{opt}^M) \quad (31)$$

where $s_{opt}^M$ is given as follows:

$$s_{opt}^M = \underset{\{s\}}{\arg\min} s \quad (32)$$

s..t.

$$\sum_{u=s}^{S^M-1} \pi^M(u) = 0.$$

In block 266, the multi-layer encoder (102) is configured to set up an array $\Omega^H$ of candidate values for the slope scaling factor, $w_j$, to be used for the set $K_j^H$, as shown in the following expression:

$$\Omega^H = \{1, 1-\Delta w, 1-2\Delta w, \ldots, 1-(S^H-1)\Delta w\} \quad (33)$$

where $\Delta w$ is a configurable or fixed decrement value and $S^H$ is a configurable or fixed number of array elements in $\Omega^H$.

For a local variable s in each integer value between 0 and $S^H$, the multi-layer encoder (102) uses expressions (10) and (11) to compute or re-compute mapped chroma values $d_{jn}(w)$ and $e_{jn}(w_j)$ corresponding to the maximum and minimum chroma values $D(j, n)$ and $E(j, n)$ for each image block with n in $K_j^H$, where the slope scaling factor, $w_j$, to be used for the set $K_j^H$ is set to a candidate value in $\Omega^H$, as shown in the following expression:

$$w_j = \Omega^H[s] \quad (34)$$

Additionally, for s in each integer value between 0 and $S^H$, the multi-layer encoder (102) computes a quantity $\pi^H(s)$ that compares the number (denoted as $|K_j^H|$) of elements in $K_j^H$ with the number of image blocks with standard deviations in mapped chroma values above a threshold value T, as shown in the following expression:

$$\pi^H(s) = \quad (35)$$

$$\left( \left( \sum_{n \in K_j^H} ((D_{jn}(w_j) - E_{jn}(w_j) > 0) \,\&\&\, (d_{jn}(w_j) - e_{jn}(w_j) == 0)) \right) == 0 \right)$$

Based on $\pi^H(s)$, an optimized scaling factor $w_j^H$ of slope for the high segment of the PWL mapping function can be derived with the following expressions:

$$w_j^H = \Omega^H(s_{opt}^H) \quad (36)$$

where $s_{opt}^H$ is given as follows:

$$s_{opt}^H = \underset{\{s\}}{\arg\min} s \quad (37)$$

s..t.

$$\sum_{u=s}^{S^H-1} \pi^H(u) = 0.$$

In block 268, the multi-layer encoder (102) increments j by 1. The process flow goes to block 254.

In block 270, the multi-layer encoder (102) generates a set of optimized parameters to be used to define coordinates of the pivots of the PWL mapping function, as shown in the following expressions:

$$w^L = \max_j \{w_j^L\} \quad (38)$$

$$w^M = \max_j \{w_j^M\} \quad (39)$$

$$w^H = \max_j \{w_j^H\} \quad (40)$$

$$\mu_{min} = \min_j \{\mu_{min}(j)\} \quad (41)$$

$$\mu_{max} = \min_j \{\mu_{max}(j)\} \quad (42)$$

In block 272, based on the set of optimized parameters, the multi-layer encoder (102) generates the coordinates of all the pivots (e.g., four pivots) for the PWL mapping function, as shown in the following expressions:

$$\text{pivot\_x[ ]} = \{v_L^C, \mu_{min}, \mu_{max}, v_H^C\} \qquad (43)$$

$$\text{pivot\_y[0]} = 0 \qquad (44)$$

$$\text{pivot\_y[1]} = \text{pivot\_y[0]} + w^L(C_H^Y - C_L^Y)\frac{v_H^C - v_L^C}{v_H^Y - v_L^Y}(\mu_{min} - v_L^C) \qquad (45)$$

$$\text{pivot\_y[2]} = \text{pivot\_y[1]} + w^M(C_H^Y - C_L^Y)\frac{v_H^C - v_L^C}{v_H^Y - v_L^Y}(\mu_{max} - \mu_{min}) \qquad (46)$$

$$\text{pivot\_y[3]} = \text{pivot\_y[2]} + w^H(C_H^Y - C_L^Y)\frac{v_H^C - v_L^C}{v_H^Y - v_L^Y}(v_H^C - \mu_{max}) \qquad (47)$$

where pivot_x[ ] and pivot_y[ ] are two arrays respectively representing x coordinates and y coordinates of the four pivots.

In block 274, the multi-layer encoder (102) is configured to determine whether the total number of code words needed to accommodate the y-coordinate values of the PWL mapping function exceed the total number (e.g., 255, etc.) of available code words in a code space used to encode the BL image data. For example, the multi-layer encoder (102) can be configured to determine whether pivot_y[3] is greater than the total number (e.g., 255, etc.) of available code words. If that is the case, for a local variable n in each value between 0 and 3, the multi-layer encoder (102) can be configured to compress the y-coordinates of the PWL mapping function with the following expression:

$$\text{pivot\_y}[n] = clip3(\text{round}(\text{pivot\_y}[n]*255/(\text{pivot\_y}[3] - \text{pivot\_y}[0])), 0, 255) \qquad (48)$$

An example algorithm listing for operations illustrated in FIG. 2B is shown in the following table:

TABLE 2

$w^{opt}[j] = 1.0$ for all f. $w^{opt}[j] = 1.0$ for all j.
// for each frame;
for( j = 0; j < F ; j++ ){
  // STEP 1.a : find the maximal value for each block n in VDR domain
  Calculate D(j, n) for all n
  // STEP 1.b : find the minimal value for each block n in VDR domain
  Calculate E(j, n) for all n
  // STEP 1.c : find the average value for each block n in VDR domain
  Calculate (j, n) for all n
  // STEP 1.d : set $w_j$ = 1. quantize D(j, n) and E(j, n) in $K_j$ to BL (CNLSQ-a)
$$d_{jn}(w_j) = \text{clip3}\left(\left\lfloor w_j(C_H^Y - C_L^Y)\frac{v_H^C - v_L^C}{v_H^Y - v_L^Y}(D(j,n) - v_L^C) + C_r^C \right\rfloor, 0, 255\right)$$

(CNLSQ-b)
$$e_{jn}(w_j) = \text{clip3}\left(\left\lfloor w_j(C_H^Y - C_L^Y)\frac{v_H^C - v_L^C}{v_H^Y - v_L^Y}(E(j,n) - v_L^C) + C_r^C \right\rfloor, 0, 255\right)$$

// STEP 1.e : find block with (D(j, n) - E(j, n))> 0 and ( $d_{jn}(w_j)$ - $e_{jn}(w_j)$ == 0) ;
  //      i.e. non-zero std block index in VDR but zero in BL domain.
  Construct $K_j$ = {i | (D(j,n) - E(j,n) > 0) & &($d_{jn}(w_j)$ - $e_{jn}(w_j)$ = 0)}
  If( |$K_j$ |== 0 ){
    // using linear predictor is enough;
    $\mu_{min}(j) = v_L^C$
    $\mu_{max}(j) = v_H^C$
    $w_j^L = 1$
    $w_j^M = 1$
    $w_j^H = 1$
  } // end of linear
  else{
    // STEP 1.f : find minimal and maximal value of average value from $K_j$ $$\mu_{min}(j) = \min_{n \in K_j}\{\mu(j,n)\}$$

$$\mu_{max}(j) = \max_{n \in K_j}\{\mu(j,n)\}$$

// STEP 1.g.
    // find three sets separated by [ $v_L^C$, $_{min}(j)$], [$_{min}(j)$, $_{max}(j)$] and , [ $_{max}(j)$, $v_H^C$ ]
    $K_j^L = \{n \mid v_L^C \leq \mu(j,n) < \mu_{min}(j), \forall n\}$
    $K_j^M = \{n \mid \mu_{min}(j) \leq \mu(j,n) < \mu_{max}(j), \forall n \in K_j\}$
    $K_j^H = \{n \mid \mu_{max}(j) \leq \mu(j,n) \leq v_H^C, \forall n\}$
    // STEP 2.a: calculate std for each block in $K_j^L$ in BL domain with different $w_j$
    $\Omega^L = \{1, 1-w, 1-2w, ..., 1-(S^L-1)w\}$
    for( s = 0; s < $S^L$; s++ ){
      $w_j = \Omega^L[s]$;
      // STEP 2.a.1: quantize D(j, n) in $K_j^L$ to BL with slope $w_j$ using (CNLSQ-a)
      // STEP 2.a.2: quantize E(j, n) in $K_j^L$ to BL with slope $w_j$ using (CNLSQ-b)
      // STEP 2.a.3: calculate whether given $w_j$ causes zero deviation TABLE 2-continued $$\pi^L(s) = \left(\left(\sum_{n \in K_j^L} ((D_{jn}(w_j) - E_{jn}(w_j) > 0) \; \& \; \&(d_{jn}(w_j) - e_{jn}(w_j) == 0))\right) == 0\right)$$

}

$$s_{opt}^L = \arg\min_{\{s\}} s \;\; s..t. \;\; \sum_{u=s}^{S^L-1} \pi^L(u) = 0.$$

$w_j^L = \Omega^L(s_{opt}^L)$
// STEP 2.b: calculate std for each block in $K_j^M$ in BL domain with different $w_j$
$\Omega^M = \{1, 1+w, 1+2w, ..., 1 + (S^M-1)w\}$
for( s = 0; s < $S^M$; s++ ){
   $w_j = \Omega^M[s]$;
   // STEP 2.b.1: quantize D(j, n) in $K_j^M$ to BL with slope $w_j$ using (CNLSQ-a)
   // STEP 2.b.2: quantize E(j, n) in $K_j^M$ to BL with slope $w_j$ using (CNLSQ-b)
   // STEP 2.b.3: calculate whether given $w_j$ causes zero deviation $$\pi^M(s) = \left(\left(\sum_{n \in K_j^M} ((D_{jn}(w_j) - E_{jn}(w_j) > 0) \; \& \; \&(d_{jn}(w_j) - e_{jn}(w_j) == 0))\right) == 0\right)$$

}
// find the first zero leading a sequence of zeros towards the end of list $$s_{opt}^M = \arg\min_{\{s\}} s \;\; s..t. \;\; \sum_{u=s}^{S^M-1} \pi^M(u) = 0.$$

$w_j^M = \Omega^M(s_{opt}^M)$
// STEP 2.c: calculate std for each block in $K_j^H$ in BL domain with different $w_j$
$\Omega^M = \{1, 1-w, 1-2w, ..., 1 - (S^H-1)w\}$
for( s = 0; s < $S^H$; s++ ){
   $w_j = \Omega^H[S]$;
   // STEP 2.c.1: quantize D(j, n) in $K_j^H$ to BL with slope $w_j$ using (CNLSQ-a)
   // STEP 2.c.2: quantize E(j, n) in $K_j^H$ to BL with slope $w_j$ using (CNLSQ-b)
   // STEP 2.c.3: calculate whether given $w_j$ causes zero deviation $$\pi^H(s) = \left(\left(\sum_{n \in K_j^H} ((D_{jn}(w_j) - E_{jn}(w_j) > 0) \; \& \; \&(d_{jn}(w_j) - e_{jn}(w_j) == 0))\right) == 0\right)$$

}

$$s_{opt}^H = \arg\min_{\{s\}} s \;\; s..t. \;\; \sum_{u=s}^{S^H-1} \pi^H(u) = 0.$$

$w_j^H = \Omega^H(s_{opt}^H)$
} // end of non-linear
}
// STEP 3: construct PWL $$w^L = \max_j \{w_j^L\}$$

$$w^M = \max_j \{w_j^M\}$$

$$w^H = \max_j \{w_j^H\}$$

$$\mu_{min} = \min_j \{\mu_{min}(j)\}$$

$$\mu_{max} = \max_j \{\mu_{max}(j)\}$$

// input VDR partition points
pivot_x[ ] = { $v_L^C$, $\mu_{min}$, $\mu_{max}$, $v_H^C$ };
// output BL partition points
pivot_y[0] = 0;

TABLE 2-continued $$\text{pivot\_y}[1] = \text{pivot\_y}[0] + w^L(C_H^Y - C_L^Y)\frac{v_H^C - v_L^C}{v_H^Y - v_L^Y}(\mu_{min} - v_L^C)$$

$$\text{pivot\_y}[2] = \text{pivot\_y}[1] + w^M(C_H^Y - C_L^Y)\frac{v_H^C - v_L^C}{v_H^Y - v_L^Y}(\mu_{max} - \mu_{min})$$

$$\text{pivot\_y}[3] = \text{pivot\_y}[2] + w^H(C_H^Y - C_L^Y)\frac{v_H^C - v_L^C}{v_H^Y - v_L^Y}(v_H^C - \mu_{max})$$

```
// if total number of codewords exceed 256, compress it
if( pivot_y[3] > 255 )
   for( n = 0; n < 4; n++ )
      pivot[n] = clip3( round(pivot[n] * 255/( pivot_y[3] - pivot_y[0] )), 0, 255);
end
```

In some example embodiments, one or more of linear or non-linear quantizers may be used to quantize higher bit depth (e.g., 12+ bits, etc.) image data to lower bit depth (e.g., 8 bits, etc.) image data. Different quantizers in different color spaces and/or in different color channels may be selected. For example, to alleviate/reduce/remove contouring artifacts (e.g., in smooth areas, etc.) and other artifacts, video signals may be quantized in different color spaces and/or with different quantization methods. In some embodiments, quantization as described herein may comprise one or more of: linear quantization, linear stretching, curve-based/non-uniform quantization probability-density-function (Pdf) optimized quantization, vector quantization, etc. The overall optimized parameter values may be selected on the basis of any of: a frame, multiple frames, a scene, multiple scenes, etc. In some embodiments, a specific type of quantization may have a corresponding relationship with one or more types of prediction methods and/or inverse mapping.

Quantization may be performed on an individual channel basis or on two or more channels at the same time. In an example embodiment, vector quantization may be performed across two or more color channels. For example, a coordinate system (e.g., 3D Cartesian, etc.) may be setup using color channels in a color space as axes. Spatial transformation such as rotation may be performed in the coordinate system to create new axes that are defined as combinations (or sums of projections) of the two or more color channels in the color space. Code words in the two or more color channels as projected to form one of the new axes may be quantized together by a quantizer over the one of the new axes.

In some embodiments, a specific quantization method may be selected based on how well it can compress output multi-layer VDR image data while still maintaining high perceptual quality with the compressed output VDR image data on the VDR decoder side.

In some embodiments, a specific quantization method and/or optimal parameter values may be selected to compensate weaknesses of codecs. For example, a codec may not perform well in compressing black areas, and may even output contouring artifacts in a reconstructed VDR image. Quantization as described herein may use a specific curve (e.g., Sigmoid curve, mu-law, a human-perceptual based curve, etc.) to generate image data with less contouring artifacts visible in a reconstructed VDR image.

A multi-layer encoder under techniques as described herein may take input VDR image data as the only input for image content to be processed by the multi-layer encoder.

While the input VDR image data may be provided to enhancement layer data processing, perceptual quantization, which may be performed on-the-fly (e.g., at the same wire speed at which the input VDR is inputted into the VDR encoder, etc.), may be used to generate input image data to base layer data processing as described herein.

Quantization as described herein may be performed in one or more different ways. Quantization may perform a global quantization in which an entire frame or an entire scene is quantized using a single setting. Quantization may also perform a partition-based (local) quantization in which each frame is partitioned into a plurality of non-overlapping regions and each non-overlapping region is quantized using its own setting. Quantization may perform a partition-based (local) quantization in which each frame is partitioned into a plurality of non-overlapping regions and each non-overlapping region is quantized using its own setting, but quantizer settings for a specific non-overlapping region are determined based on analysis data derived from one or more overlapped regions. Advanced quantization may be applied in any of one or more different color spaces. Examples of color spaces in which advanced quantization may be applied include, but are not only limited to, any of: RGB color spaces, YCbCr color spaces, YCoCg color spaces, ACES color spaces, or other color spaces.

In some embodiments, a color space in which quantization is applied is kept the same as a color space in which prediction is performed. This may be so in both VDR image encoding process and VDR image decoding process. Color space transformation may be performed as appropriate if a color space in which image rendering occurs is different from a color space in which quantization occurs.

9. Example Process Flows

Figure 3A:
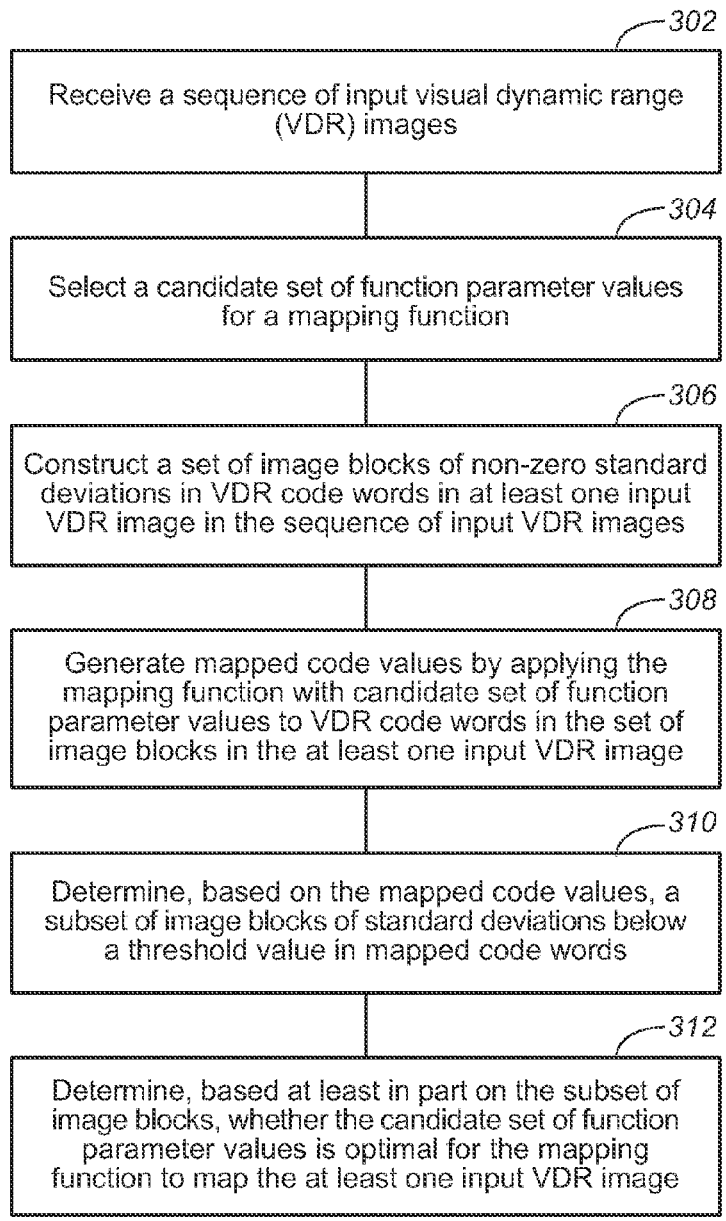
FIG. 3A and FIG. 3B illustrate example process flows, according to an embodiment of the invention.

FIG. 3A illustrates an example process flow according to an example embodiment of the present invention. In some example embodiments, one or more computing devices or components may perform this process flow. In block 302, a multi-layer VDR video encoder (e.g., 102 of FIG. 1A) receives a sequence of input visual dynamic range (VDR) images.

In block 304, the multi-layer VDR video encoder (102) selects a candidate set of function parameter values for a mapping function from a plurality of candidate sets of function parameter values for the mapping function.

In block 306, the multi-layer VDR video encoder (102) constructs a set of image blocks of non-zero standard deviations in VDR code words in at least one input VDR image in the sequence of input VDR images.

In block 308, the multi-layer VDR video encoder (102) generates mapped code values by applying the mapping function with the candidate set of function parameter values to VDR code words in the set of image blocks in the at least one input VDR image.

In block 310, the multi-layer VDR video encoder (102) determines, based on the mapped code values, a subset of image blocks of standard deviations below a threshold value in mapped code words. Here the subset of image blocks is a subset in the set of image blocks.

In block 312, the multi-layer VDR video encoder (102) determines, based at least in part on the subset of image blocks, whether the candidate set of function parameter values is optimal for the mapping function to map the at least one input VDR image.

In an embodiment, in response to determining that the candidate set of function parameter values is optimal for the mapping function to map the at least one input VDR image, the multi-layer VDR video encoder (102) is configured to determine whether the candidate set of function parameter values should be used as an overall optimal set of function parameter values by the mapping function to map a plurality of input VDR images that include the at least one input VDR image.

In an embodiment, in response to determining that the candidate set of function parameter values should be used as an overall optimal set of function parameter values by the mapping function to map the plurality of input VDR images that include the at least one input VDR image, the multi-layer VDR video encoder (102) is configured to further performing: generating a plurality of mapped images that correspond to the plurality of input VDR images by applying the mapping function with the overall optimal set of function parameter values to the plurality of VDR images; compressing the plurality of mapped images as base-layer (BL) image data into an output multi-layer video signal.

In an embodiment, the multi-layer VDR video encoder (102) is configured to further performing: decoding the BL image data; generating prediction image data based at least in part on an inverse mapping of the BL image data; generating residual values based at least in part on the prediction image data and the at least one input VDR image; applying non-linear quantization to the residual values to generate EL image data, the residual values comprising high bit depth values, and the EL image data comprising low bit depth values; and compressing the EL image data into the output multi-layer video signal.

In an embodiment, the set of image blocks of non-zero standard deviations is computed with the VDR code words within a specific VDR value range in a plurality of VDR value ranges. The plurality of VDR value ranges comprise one or more of high value ranges, medium value ranges, or low value ranges. In an embodiment, the multi-layer VDR video encoder (102) is configured to further perform: computing a set of VDR statistical values for the set of image blocks of non-zero standard deviations, wherein an individual VDR statistical value in the set of VDR statistical values represents one of an arithmetic average, an arithmetic medium, a geometric average, a geometric medium, a maximum, or a minimum in VDR code words of an individual image block in the set of image blocks of non-zero standard deviations; and generating, based on the set of VDR statistical values, the plurality of VDR value ranges.

In an embodiment, BL image data derived from the sequence of input VDR images is compressed by a first 8-bit encoder into a multi-layer video signal, and EL image data derived from the sequence of input VDR images is compressed by a second 8-bit encoder in the multi-layer encoder into the multi-layer video signal.

Figure 3B:
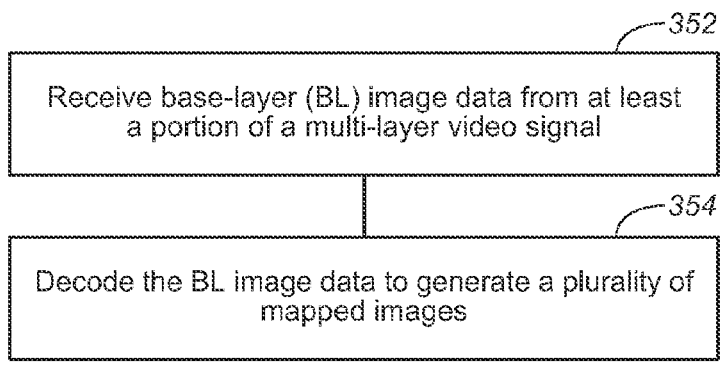

FIG. 3B illustrates an example process flow according to an example embodiment of the present invention. In some example embodiments, one or more computing devices or components may perform this process flow. In block 352, a multi-layer VDR video decoder (e.g., 152 of FIG. 1B) receives base-layer (BL) image data from at least a portion of a multi-layer video signal.

In block 354, the multi-layer VDR video decoder (152) or the base-layer video decoder (172) decodes the BL image data to generate a plurality of mapped images.

Here, the plurality of mapped images was derived by applying a mapping function with an overall optimal set of function parameter values to a plurality of visible dynamic range (VDR) images. The overall optimal set of function parameter values may be selected from a plurality of individual optimal sets of function parameter values for the mapping function. Each individual optimal set of function parameter values is determined based at least in part on applying the mapping function with a plurality of candidate sets of function parameters to at least one VDR image in the plurality of VDR images.

In an embodiment, the multi-layer VDR video decoder (152) or the base-layer video decoder (172) is configured to render the plurality of mapped images in a display system.

In an embodiment, the multi-layer VDR video decoder (152) is configured to further perform: generating prediction image data based at least in part on an inverse mapping of the plurality of mapped images; decoding EL image data from the multi-layer video signal; applying non-linear dequantization to the EL image data to generate residual values, the residual values comprising high bit depth values, and the EL image data comprising low bit depth values; and generating at least one VDR image based at least in part on the prediction image data and the residual values. In an embodiment, the multi-layer VDR video decoder (152) is configured to render the at least one VDR image in a VDR display system.

In an embodiment, the plurality of input VDR images or the plurality of mapped images forms a scene.

In an embodiment, inverse mapping as described herein is based on one or more lookup tables generated from the mapping function with the overall optimal set of function parameter values.

In an embodiment, a mapping function as described herein represents at least one of power functions, linear quantization functions, or piece-wise linear quantization functions.

In an embodiment, a candidate set of function parameter values for the mapping function as described herein represents a candidate exponent value for a power function.

In an embodiment, a candidate set of function parameter values for the mapping function as described herein represents one or more pivots for a piece-wise linear quantization function.

In an embodiment, a set of image blocks of non-zero standard deviations as described herein is computed with the VDR code words for a specific channel in a plurality of channels of a color space. The plurality of channels may comprise one or more of: a luminance channel, a chroma channel, a red color channel, a blue color channel, a green color channel, or other primary channels. In an embodiment, a different mapping function is used to map different VDR code words for a different channel in the plurality of channels.

In an embodiment, at least one of one or more encoders in a video encoder as described herein comprises any of: encoders of one of different bit depths (e.g., 8-bit encoder, 10-bit encoder, 12-bit encoder, etc.), an advanced video coding (AVC) encoder, a Moving Picture Experts Group (MPEG)-2 encoder, a High Efficiency Video Coding (HEVC) encoder, etc.

In an embodiment, at least one of one or more decoders in a video decoder as described herein comprises any of: decoders of one of different bit depths (e.g., 8-bit decoder, 10-bit decoder, 12-bit decoder, etc.), an advanced video coding (AVC) decoder, a Moving Picture Experts Group (MPEG)-2 decoder, a High Efficiency Video Coding (HEVC) decoder, etc.

In an embodiment, input VDR images or mapped images as described herein are perceptually encoded.

In various example embodiments, an encoder, a decoder, a system, an apparatus, or one or more other computing devices performs any or a part of the foregoing methods as described.

10. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
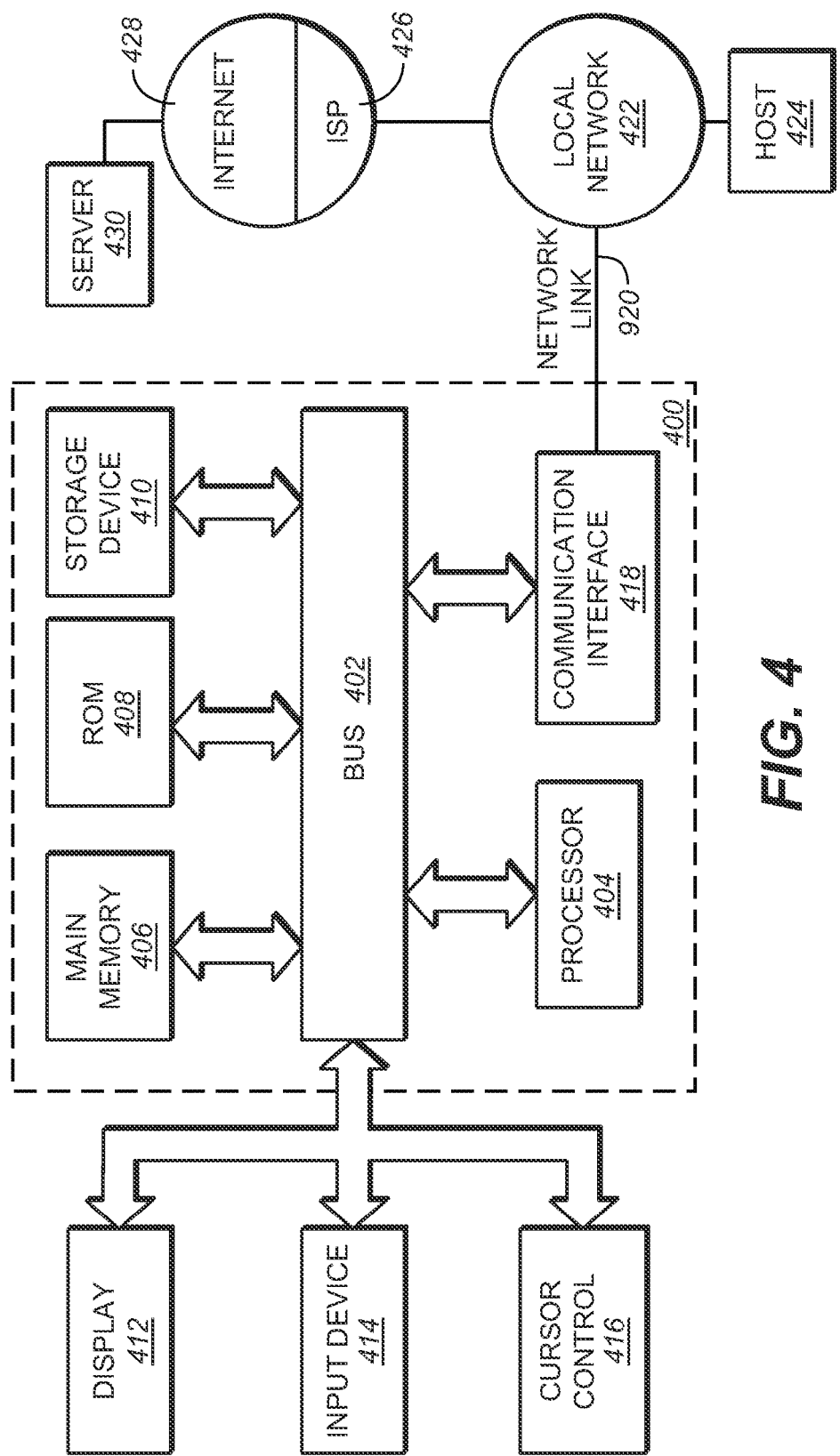
FIG. 4 illustrates an example hardware platform on which a computer or a computing device as described herein may be implemented.

For example, FIG. 4 is a block diagram that illustrates a computer system 400 upon which an example embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a liquid crystal display, for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

11. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method, comprising:
by apparatus comprising one or more data processors configured by software, one or more programmable logic devices, one or more logic circuits or a combination thereof:
selecting a candidate set of function parameter values for a mapping function from a plurality of candidate sets of function parameter values for the mapping function;
dividing each input image, in a sequence of input images, into image blocks;
determining, for each image block, a standard deviation of pixel values in that block;
constructing a set of image blocks, from among said image blocks, having non-zero standard deviation in pixel values for at least one input image in the sequence of input images;
generating mapped image blocks by applying the mapping function with the candidate set of function parameter values to the pixel values in the set of image blocks in the at least one input image;
determining, for each mapped image block, a standard deviation of the pixel values in that block;
constructing a subset of mapped image blocks from among the mapped image blocks, each mapped image block of said subset having a standard deviation larger than a predefined threshold value;
determining a total number of mapped image blocks with non-zero standard deviations in said subset of mapped image blocks;
using the total number of mapped image blocks with non-zero standard deviations to determine whether the candidate set of function parameter values is optimal for the mapping function to map the at least one input image;
generating a plurality of mapped images that correspond to the plurality of input images by applying the mapping function with an overall optimal set of function parameter values, optimally selected from among the plurality of candidate sets of function parameter values for the mapping function, to the plurality of images;
compressing the plurality of mapped images as base-layer (BL) image data into an output multi-layer video signal.

2. The method as recited in claim 1, wherein a bit depth of the input images is equal to or larger than 12 bits.

3. The method as recited in claim 1, wherein said determining whether the candidate set of function parameter values is optimal for the mapping function to map the at least one input image is based on whether the total number of mapped image blocks in said subset is equal to a total number of image blocks in said set.

4. The method as recited in claim 1, further comprising:
in response to determining that the candidate set of function parameter values is optimal for the mapping function to map the at least one input image, determining whether the candidate set of function parameter values should be used as the overall optimal set of function parameter values by the mapping function to map a plurality of input images that include the at least one input image.

5. The method as recited in claim 1, further comprising:
decoding the BL image data;
generating prediction image data based at least in part on an inverse mapping of the BL image data;
generating residual values based at least in part on the prediction image data and the at least one input image;
applying non-linear quantization to the residual values to generate enhancement layer (EL) image data, the residual values comprising high bit depth values, and the EL image data comprising low bit depth values; and
compressing the EL image data into the output multi-layer video signal.

6. The method as recited in claim 5, further comprising outputting metadata comprising the determined overall optimal set of function parameter values as a part of the output multi-layer video signal to a downstream device.

7. The method as recited in claim 5, wherein the inverse mapping of the BL image data is based on one or more lookup tables generated from the mapping function with the overall optimal set of function parameter values.

8. The method as recited in claim 1, wherein the mapping function represents at least one of power functions, linear quantization functions, or piece-wise linear quantization functions.

9. The method as recited in claim 1, wherein the candidate set of function parameter values for the mapping function represents a candidate exponent value for a power function.

10. The method as recited in claim 1, wherein the candidate set of function parameter values for the mapping function represents one or more pivots for a piece-wise linear quantization function.

11. The method as recited in claim 1, wherein the set of image blocks of non-zero standard deviations is computed with code words within a specific value range in a plurality of value ranges.

12. The method as recited in claim 11, wherein the plurality of value ranges comprise one or more of high value ranges, medium value ranges, or low value ranges, wherein the pixel values in the high value ranges have higher values than the pixel values in the medium value ranges and low value ranges and wherein the pixel values in the medium value ranges have higher values than the pixel values in the low value ranges and lower values than the pixel values in the high value ranges.

13. The method as recited in claim 12, further comprising:
computing a set of statistical values for the set of image blocks of non-zero standard deviations, wherein an individual statistical value in the set of statistical values represents at least one of: an arithmetic average, an arithmetic medium, a geometric average, a geometric medium, a maximum, or a minimum in pixel values of an individual image block in the set of image blocks of non-zero standard deviations;

generating, based on the set of statistical values, the plurality of pixel value ranges.

14. The method as recited in claim 1, wherein the set of image blocks of non-zero standard deviations is computed with the pixel values for a specific channel in a plurality of channels of a color space.

15. The method as recited in claim 14, wherein the plurality of channels comprises one or more of a luminance channel, a chroma channel, a red color channel, a blue color channel, a green color channel, or other primary channels.

16. The method as recited in claim 14, wherein a different mapping function is used to map different pixel values for a different channel in the plurality of channels.

17. The method as recited in claim 1, wherein base layer (BL) image data derived from the sequence of input images is compressed by a first 8 bit encoder into a multi-layer video signal, and wherein enhancement layer (EL) image data derived from the sequence of input images is compressed by a second 8 bit encoder in the multi-layer encoder into the multi-layer video signal.

18. The method as recited in claim 17, wherein at least one of the first 8 bit encoder and the second 8 bit encoder comprises at least one of: an advanced video coding (AVC) encoder, a Moving Picture Experts Group (MPEG) -2 encoder, or a High Efficiency Video Coding (HEVC) encoder.

19. The method as recited in claim 1, wherein the sequence of input images has been perceptually encoded.

20. The method as recited in claim 1, wherein at least one of the non-zero standard deviations is represented with one of non-zero max-min differences, non-zero variances, or smoothness measurement values each of which corresponds to a non-zero standard deviation.

21. An encoder performing with a processor the method as recited in claim 1.

* * * * *